(12) United States Patent
Ishii et al.

(10) Patent No.: US 8,477,405 B2
(45) Date of Patent: Jul. 2, 2013

(54) PARTICLE DISPERSION FOR DISPLAY, DISPLAY MEDIUM AND DISPLAY DEVICE

(75) Inventors: Rie Ishii, Kanagawa (JP); Jun Kawahara, Kanagawa (JP); Nami Tokunaga, Kanagawa (JP); Daisuke Nakayama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 755 days.

(21) Appl. No.: 12/559,126

(22) Filed: Sep. 14, 2009

(65) Prior Publication Data

US 2010/0225575 A1  Sep. 9, 2010

(30) Foreign Application Priority Data

Mar. 6, 2009  (JP) .................. 2009-053386

(51) Int. Cl.
*G02B 26/00* (2006.01)
(52) U.S. Cl.
USPC .......................................... 359/296
(58) Field of Classification Search
USPC ..... 359/296; 252/582, 586; 428/447; 430/32, 430/34, 38; 204/600, 450
See application file for complete search history.

(56) References Cited

U.S. PATENT DOCUMENTS

| | | | |
|---|---|---|---|
| 4,806,443 A | 2/1989 | Yanus et al. | |
| 6,113,810 A | 9/2000 | Hou et al. | |
| 7,038,655 B2 * | 5/2006 | Herb et al. | 345/107 |
| 7,532,388 B2 * | 5/2009 | Whitesides et al. | 359/296 |
| 7,545,557 B2 * | 6/2009 | Iftime et al. | 359/296 |
| 2003/0132908 A1 | 7/2003 | Herb et al. | |
| 2007/0297038 A1 | 12/2007 | Chopra et al. | |

FOREIGN PATENT DOCUMENTS

| | | |
|---|---|---|
| JP | A-H8-510790 | 11/1996 |
| JP | A-2003-131420 | 5/2003 |
| JP | A-2006-343457 | 12/2006 |
| JP | A-2006-343458 | 12/2006 |
| JP | A-2007-033637 | 2/2007 |
| JP | A-2008-3600 | 1/2008 |

OTHER PUBLICATIONS

Mar. 26, 2013 Office Action issued in Japanese Application No. 2009-053386 (with English translation).

* cited by examiner

*Primary Examiner* — Tuyen Tra
(74) *Attorney, Agent, or Firm* — Oliff & Berridge, PLC

(57) ABSTRACT

A particle dispersion for display including: first particles for display including a colorant and a first polymer having a first charging group, the first particles for display being movable in response to an electric field; a first polymeric dispersant attached to the first particles for display; second particles for display including a colorant and a second polymer having a second charging group, the second particles for display being movable in response to an electric field; a second polymeric dispersant attached to the second particles for display; and a dispersing medium in which the first particles for display and the second particles for display are dispersed, the first polymeric dispersant and the second polymeric dispersant having different weight average molecular weights so that the first particles for display and the second particles for display start moving upon application of different voltages.

8 Claims, 4 Drawing Sheets

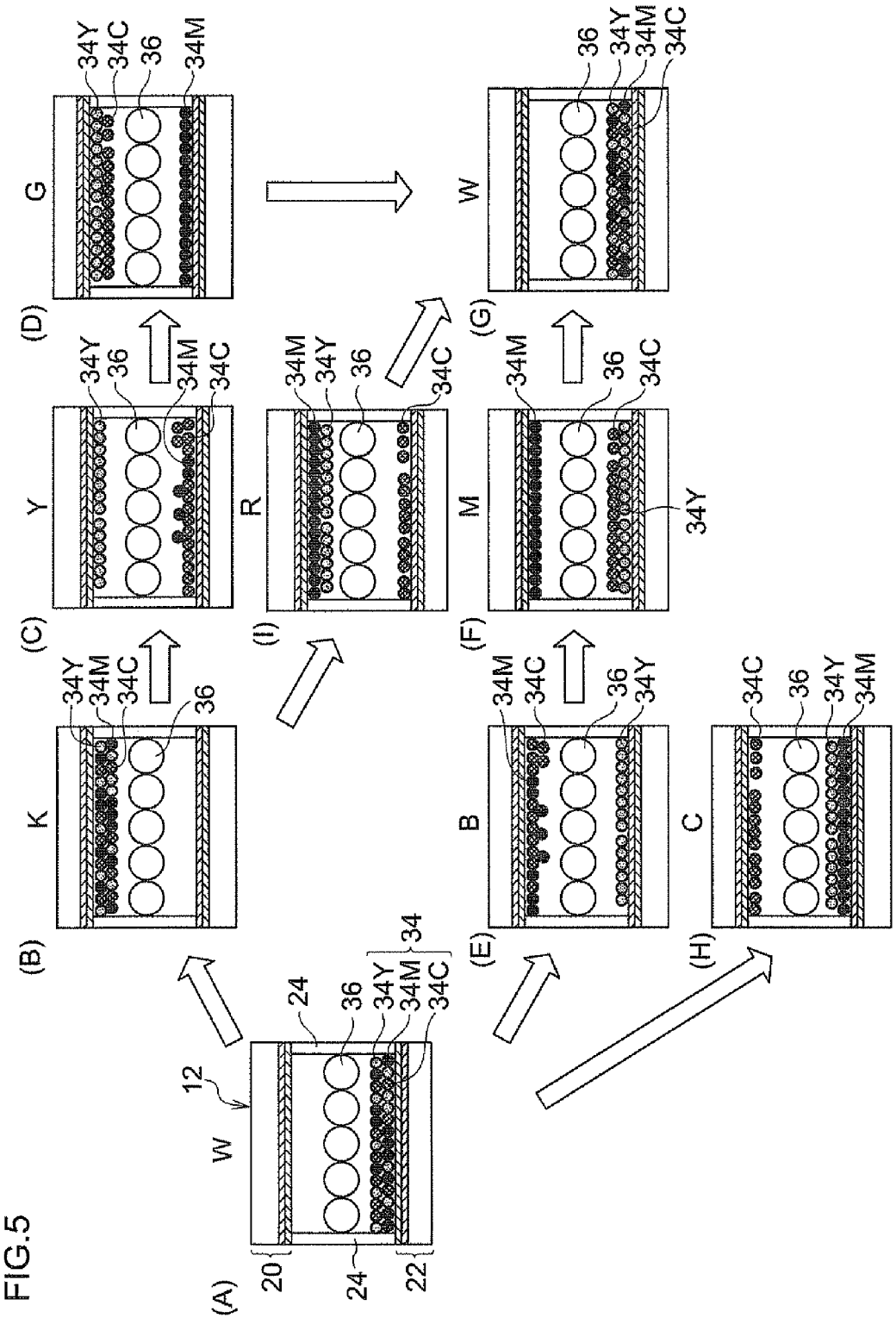

PARTICLE DISPERSION FOR DISPLAY, DISPLAY MEDIUM AND DISPLAY DEVICE

CROSS-REFERENCE TO RELATED APPLICATION

This application is based on and claims priority under 35 USC 119 from Japanese Patent Application No. 2009-053386 filed Mar. 6, 2009.

BACKGROUND

The invention relates to a particle dispersion for display, a display medium, and a display device.

RELATED ART

In these days, studies on electrophoretic display device as a display having a memory property have been intensely conducted. In this display system, an electrophoretic material including charged particles for display (electrophoretic particles) dispersed in a liquid is enclosed in a cell formed by a pair of electrode substrates, and the display is performed by these electrophoresic particles that alternately move in the cell toward the display side and the rear side, upon application of an electric field.

SUMMARY

According to an aspect of the invention, there is provided a particle dispersion for display including:

first particles for display including a colorant and a first polymer having a first charging group, the first particles for display being movable in response to an electric field;

a first polymeric dispersant attached to the first particles for display;

second particles for display including a colorant and a second polymer having a second charging group, the second particles for display being movable in response to an electric field;

a second polymeric dispersant attached to the second particles for display; and a dispersing medium in which the first particles for display and the second particles for display are dispersed, the first polymeric dispersant and the second polymeric dispersant having different weight average molecular weights so that the first particles for display and the second particles for display start moving upon application of different voltages.

BRIEF DESCRIPTION OF THE DRAWINGS

Exemplary embodiments of the present invention will be described in detail based on the following figures, wherein:

FIG. 5 is a schematic view showing the relationship between the mode of voltage applied between the substrates of the display medium and the mode of movement of particles.

DETAILED DESCRIPTION

Figure 1:
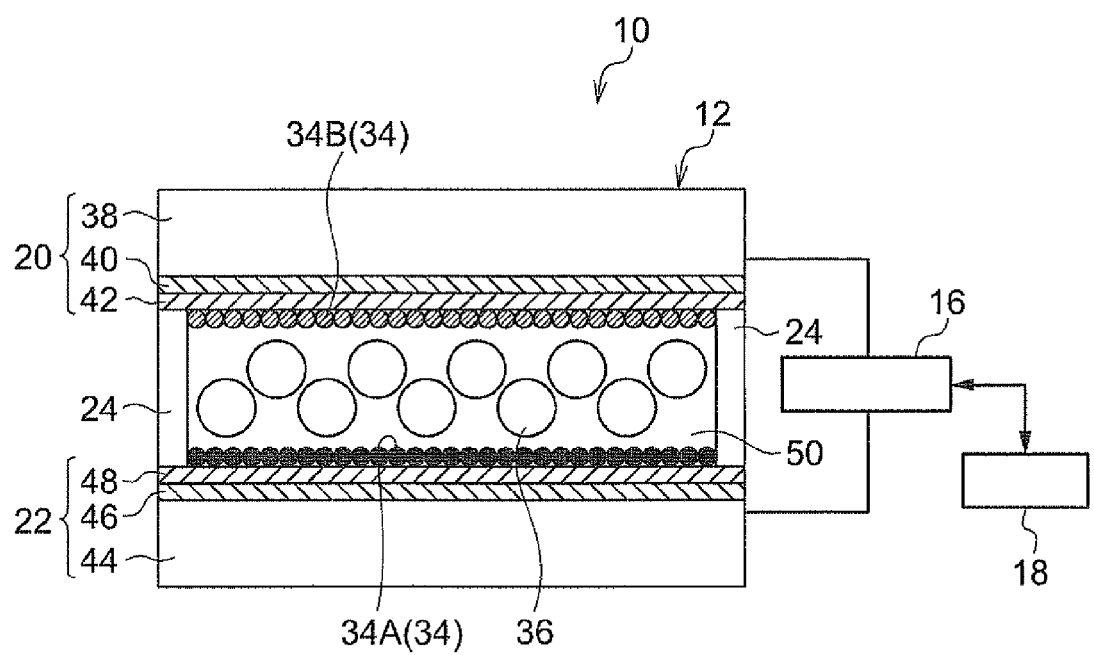
FIG. 1 is a schematic view of a display device according to a first exemplary embodiment of the invention.

In the following, details of the present invention will be described.

<Particle Dispersion for Display>

The particle dispersion for display according to the invention includes particles for display that move in response to an electric field and a dispersing medium in which the particles for display are dispersed. The particles for display exhibit a charging polarity when dispersed in the dispersing medium, and move in the dispersing medium in response to an electric field. The particle dispersion for display includes at least two kinds of particles for display (first particles for display and second particles for display). Specifically, the first particles for display include a colorant and a first polymer having a first charging group, and move in response to an electric field. On the other hand, the second particles for display include a colorant and a second polymer having a second charging group, and move in response to an electric field.

Further, a first polymeric dispersant is attached to the first particles for display, while a second polymeric dispersant is attached to the second particles for display. The first and second polymeric dispersants have different values of weight average molecular weight so that the first and second particles for display start moving at different voltages. The particle dispersion for display may further include third particles for display. In this case, a third polymeric dispersant attached to the third particles for display has a different weight average molecular from that of the first and second polymeric dispersants. Namely, when particles for display of different kinds are included in the particle dispersion, a polymeric dispersant having a different weight average molecular weight is attached to the particles for display of different kind.

Since the particle dispersion for display according to the invention includes at least two kinds of particles for display, and a polymeric dispersant of a different weight average molecular weight from each other is attached to the particles for display of different kind, the particles for display of different kinds start to move upon application of different values of voltage from each other. The reason for this is presumed as follows.

The reason that the particles for display of different kinds start to move at different values of electric field intensity (threshold) is considered to be that the level of an attracting force formed among the particles for display of each kind is different from each other. Accordingly, it is presumed that as the particles among which a small attracting force is formed start to move at a small electric field intensity, while the particles among which a large attracting force is formed start to move at a large electric field intensity.

Typically, whether or not the particles aggregate or disperse in a colloid dispersion system, such as a dispersion including particles for display (electrophoretic particles), is explained by a DLVO theory, and whether the state of the particles is dispersed or aggregated is determined by the sum of an attraction force and an electrostatic repulsive force formed among the particles. Since it is difficult to maintain the dispersed state of the particles simply by means of electrostatic repulsion, the state of dispersion/aggregation of the particles needs to be regulated by the adsorption of a polymeric dispersant. The repulsion effect brought by the adsorbed polymeric dispersant is known to be dependent on the adsorption thickness thereof, and this adsorption thickness is known to be dependent on the molecular weight of the adsorbing polymer. In view of the above, it is presumed that the value of threshold voltage can be controlled by regulating the molecular weight of the polymeric dispersant to be attached to the particles.

In the particle dispersion for display according to the invention, each kind of polymeric dispersant attached to the particles for display has a different weight average molecular weight. Specifically, the weight average molecular weight of the first polymeric dispersant or the second polymeric dispersant is from 3 times or about 3 times to 20 times or about 20 times greater than the other, preferably from 4 times to 15 times greater than the other.

There is no particular limitation as to whether the weight average molecular weight of the first polymeric dispersant is greater than that of the second polymeric dispersant, or the weight average molecular weight of the second polymeric dispersant is greater than that of the first polymeric dispersant, as long as these two kinds of polymeric dispersant have a different weight average molecular weight to each other. Accordingly, for example, the weight average molecular weight of the first polymeric dispersant may be from 3 times to 20 times greater than that of the second polymeric dispersant, or the weight average molecular weight of the second polymeric dispersant may be from 3 times to 20 times greater than that of the first polymeric dispersant.

When particles for display other than the first and second particles for display are used, the weight average molecular weight of the polymeric dispersant to be attached to these particles for display preferably satisfies the above relationship with respect to the first and second polymeric dispersants.

The weight average molecular weight of the polymeric dispersant may be from 5,000 to 3,000,000, for example, preferably from 30,000 to 1,500,000. The polymeric dispersants used in the particle dispersion for display are preferably selected within this range.

The polymeric dispersant may be attached to the particles for display by chemical bonding, or may be attached without chemical bonding (by adsorption, coating or the like).

The voltage at which the particles for display start to move refers to a voltage upon application of which the particles for display move from the side of one electrode to the side of the other electrode, whereby the displayed color starts to change.

The following are exemplary embodiments of the particles dispersion for display according to the invention.

Exemplary Embodiment A

Exemplary embodiment A is a particle dispersion for display according to the invention, wherein:

the first charging group of the first polymer of the first particles for display is an acidic group or a basic group;

the first polymeric dispersant has a group that is acidic if the first charging group is basic, and has a group that is basic if the first charging group is acidic;

the second charging group of the second polymer of the second particles for display is a group that is acidic if the first charging group is basic, and is a group that is basic if the first charging group is acidic;

the second polymeric dispersant has a group that is acidic if the second charging group is basic, and has a group that is basic if the second charging group is acidic, the first particles for display and the second particles for display have a different charging polarity to each other, and the first particles for display and the first polymeric dispersant form an acid-base interaction with each other, and the second particles for display and the second polymeric dispersant form an acid-base interaction with each other.

In this exemplary embodiment, each kind of polymeric dispersant to be attached to the particles for display has a different weight average molecular weight, and an acid-base interaction is formed between the particles for display and the polymeric dispersant attached to the same. Therefore, in a system in which at least two kinds of particles for display are dispersed, the voltage that applies an electric field at which the particles for display of each kind start to move can be set at different levels. The reason for this is presumed as follows.

For example, in the case of positively-charged particles for display that are formed from a polymer having a basic group and are dispersed in a dispersing medium by means of a polymeric dispersant having an acidic group, when the particles are attracted to the cathode side upon application of an electric field, the acidic group in the polymeric dispersant attached to one particle forms an acid-base interaction with the basic group of the polymer that forms the adjacent particles. This is considered to function as an attraction force among the particles. The same explanation will apply also to the particles that are formed from a polymer having an acidic group and are dispersed by means of a polymeric dispersant having a basic group.

The intensity of acid-base interaction at this time can be controlled by regulating the amount of acidic group or basic group in the polymer that forms the particles, and the amount of acidic group or basic group in the polymeric dispersant. Therefore, it is presumed that the threshold voltage of the particles of different kinds can be set at different levels by controlling the amount of functional groups in the polymer and the polymeric dispersant for the positively-charged particles and the negatively-charged particles.

The particle dispersion for display of this exemplary embodiment may have a configuration of either (1) or (2) as described below.

(1) The first particles for display are formed from a first polymer having a basic group and are positively charged, the first polymeric dispersant has an acidic group, the second particles for display are formed from a second polymer having an acidic group and are negatively charged, and the second polymeric dispersant has a basic group.

(2) The first particles for display are formed from a first polymer having an acidic group and are negatively charged, the first polymeric dispersant has a basic group, the second particles for display are formed from a second polymer having a basic group and are positively charged, and the second polymeric dispersant has an acidic group.

When the particle dispersion further includes third particles for display that are different from the first and second particles for display, the type of the charging group (acidic or basic) of the polymer that forms the third particles for display is preferably the same as the type of the charging group (acidic or basic) of the polymer that forms the particles for display that are charged to the same polarity, and the type of the functional group (acidic or basic) of the polymeric dispersant attached to the third particles for display is preferably the same as the type of the functional group (acidic or basic) of the polymeric dispersant attached to the particles for display that are charged to the same polarity.

In this exemplary embodiment, the polymeric dispersant may be selected from a polymeric dispersant having an acidic group or a polymeric dispersant having a basic group, depending on the type of particles for display.

The polymeric dispersant having an acidic group is preferably a copolymer including at least one kind of a monomer having an acidic group (anionic monomer), such as a carboxylic monomer, a sulfonic monomer or a phosphoric monomer.

Examples of the carboxylic monomer include (meth) acrylic acid, crotonic acid, itaconic acid, maleic acid, fumaric acid, citraconic acid, an anhydride or a monoalkyl ester of these monomers, and a vinyl ether having a carboxyl group such as carboxyethylvinyl ether or carboxypropylvinyl ether.

Examples of the sulfonic monomer include styrene sulfonic acid, 2-acrylamide-2-methylpropane sulfonic acid, 3-sulfopropyl (meth)acrylic acid ester, bis-(3-sulfopropyl)-itaconic acid ester, and a salt of these monomers. A sulfuric monoester of 2-hydroxyethyl (meth)acrylic acid or a salt thereof may also be mentioned.

Examples of the phosphoric monomer include vinyl phosphonic acid, vinyl phosphate, acid phosphoxyethyl (meth) acrylate, acid phosphoxypropyl (meth)acrylate, bis(methacryloyloxyethyl)phosphate, diphenyl-2-methacryloyloxyethyl phosphate, diphenyl-2-acryloyloxyethyl phosphate, dibutyl-2-methacryloyloxyethyl phosphate, dibutyl-2-acryloyloxyethyl phosphate and dioctyl-2-(meth) acryloyloxyethyl phosphate.

Preferable examples of the anionic monomer include those having (meth)acrylic acid or sulfonic acid, more preferably those in the form of an ammonium salt before or after the polymerization. The ammonium salt may be produced by reacting the monomer with a tertiary amine or a quaternary ammonium hydroxide.

At least one of the monomer to be copolymerized with the anionic monomer is preferably a monomer capable of making the particles for display (electrophoretic particles) dispersible in a dispersing medium. For example, if the dispersing medium is silicone oil, a vinyl monomer having a polysiloxane or the like may be preferably used. When the dispersing medium is a hydrocarbon-based solvent, a monomer having a long-chain or branched alkyl group, an alicyclic hydrocarbon group, an aromatic hydrocarbon group or a heterocyclic group, or the like, may be preferably used.

Preferable examples of the polymeric dispersant having a basic group include a copolymer including at least one kind of a monomer having a basic group (cationic monomer).

Specific examples of the cationic monomer include (meth) acrylates having an aliphatic amino group, such as N,N-dimethylaminoethyl (meth)acrylate, N,N-diethylaminoethyl (meth)acrylate, N,N-dibutylaminoethyl (meth)acrylate, N,N-hydroxyethylaminoethyl (meth)acrylate, N-ethylaminoethyl (meth)acrylate, N-octyl-N-ethylaminoethyl (meth)acrylate, and N,N-dihexylaminoethyl (meth)acrylate; aromatic-substituted ethylene monomers having a nitrogen-containing group, such as dimethylaminostyrene, diethylaminostyrene, dimethylaminomethylstyrene and dioctylaminostyrene; nitrogen-containing vinyl ether monomers, such as vinyl-N-ethyl-N-phenylaminoethyl ether, vinyl-N-butyl-N-phenylaminoethyl ether, triethanolamine divinyl ether, vinyl diphenyl aminoethyl ether, N-vinyl hydroxyethyl benzamide, and m-aminophenyl vinyl ether; vinylamine; pyrroles such as N-vinyl pyrrole; pyrrolines such as N-vinyl-2-pyrroline and N-vinyl-3-pyrroline; pyrrolidines such as N-vinyl pyrrolidine, vinylpyrrolidine amino ether, and N-vinyl-2-pyrrolidone; imidazoles such as N-vinyl-2-methyl imidazole; imidazolines such as N-vinyl imidazoline, indoles such as N-vinyl indole, indolines such as N-vinyl indoline, carbazoles such as N-vinyl carbazole and 3,6-dibromo-N-vinyl carbazole, pyridines such as 2-vinyl pyridine, 4-vinyl pyridine and 2-methyl-5-vinyl pyridine, piperidines such as (meth)acrylic piperidine, N-vinyl piperidone and N-vinyl piperadine, quinolines such as 2-vinyl quinoline and 4-vinyl quinoline, pyrazoles such as N-vinyl pyrazole and N-vinyl pyrazoline, oxazoles such as 2-vinyl oxazole, and oxazines such as 4-vinyl oxazine and morpholinoethyl (meth)acrylate.

In view of versatility, the cationic monomer is preferably a (meth)acrylate having an aliphatic amino group such as N,N-dimethylaminoethyl (meth)acrylate and N,N-diethylaminoethyl (meth)acrylate. In particular, these monomers are preferably used in the form of a quaternary ammonium salt, before or after the polymerization. The quaternary ammonium salt may be obtained by allowing the monomer to react with an alkyl halide or a tosylate.

At least one of the monomer to be copolymerized with the cationic monomer is preferably a monomer capable of making the particles for display (electrophoretic particles) dispersible in a dispersing medium. For example, if the dispersing medium is silicone oil, a vinyl monomer having a polysiloxane or the like may be preferably used. When the dispersing medium is a hydrocarbon-based solvent, a monomer having a long-chain or branched alkyl group, an alicyclic hydrocarbon group, an aromatic hydrocarbon group or a heterocyclic group, or the like, may be preferably used.

Specific embodiments of the particle dispersion according to this exemplary are not particularly limited to the above. For example, the following exemplary embodiments are also within the scope of the invention.

Exemplary Embodiment B

In this exemplary embodiment, the first and second particles for display (the polymer that forms these particles) each include a hydrogen-bonding donor and a hydrogen-bonding acceptor, and a hydrogen-bonding interaction is formed within the first particles for display, within the second particles for display, and between the first and second particles for display, respectively.

Alternatively, the first and second polymeric dispersants each include a hydrogen-bonding donor and a hydrogen-bonding acceptor, and a hydrogen-bonding interaction is formed within the first particles for display, within the second particles for display, and between the first and second particles for display, respectively.

In this case, however, the hydrogen-bonding interaction between the hydrogen-bonding donor and the hydrogen-bonding acceptor within each particle is preferably not formed. The hydrogen-bonding interaction here refers to an intermolecular force produced by an interaction formed between the hydrogen-bonding donor and the hydrogen-bonding acceptor.

In this exemplary embodiment, each kind of polymeric dispersant to be attached to the particles for display has a different weight average molecular weight, and a hydrogen-bonding interaction is formed between the particles for display or the like. Therefore, in a system in which at least two kinds of particles for display are dispersed, the voltage that applies an electric field at which the particles for display of each kind start to move can be set at different levels. The reason for this is presumed as follows.

In the particles for display (electrophoretic particles) that are attracted by the application of a voltage, the hydrogen-bonding donor acceptor) included in each particle (or a polymer that forms the particle) forms a hydrogen-bonding interaction with the hydrogen-bonding acceptor (donor) included in the adjacent particles. This is considered to function as an attracting force among the particles.

The intensity of the hydrogen-bonding interaction at this time can be controlled by the amount of the hydrogen-bonding donor or acceptor included in the particles. Therefore, it is presumed that the threshold voltage of the particles of different kinds can be set at different levels by controlling the amount of functional group that contributes as a hydrogen-bonding donor or acceptor included in the particles of different kinds.

In this exemplary embodiment, the hydrogen-bonding donor included in the particles of each kind is a group having a hand that forms a hydrogen bonding, and the hydrogen-bonding acceptor is a group that accepts the hand of the hydrogen-bonding donor.

Examples of the hydrogen-bonding donor include a quaternary ammonium group, a pyridinium group, and an imidazolium group.

Examples of the hydrogen-bonding acceptor include an ester group, a ketone group, a pyridine group, a carboxylate group, a sulfonate group, and a phosphonate group.

Examples of the functional group having both the hydrogen-bonding donor and the hydrogen-bonding acceptor include a hydroxyl group, a carboxyl group, an amino group, a secondary amino group, an amide group, and an imidazole group.

Examples of the monomer that forms the particles for display or the polymeric dispersant and has both functional groups of the hydrogen-bonding donor and the hydrogen-bonding acceptor include hydroxy (meth)acrylate, (meth)acrylic acid, acrylamide, N-isopropyl acrylamide, 2-acrylamide-2-methylpropane sulfonic acid, and 1-vinyl imidazole.

Specific embodiments of the particle dispersion according to this exemplary embodiment are not particularly limited to the above. For example, the following exemplary embodiments are also within the scope of the invention.

Exemplary Embodiment C

In this exemplary embodiment, the first particles for display and the second particles for display (polymers that form these particles) each include a structure having a π electron, and a π-π stacking interaction is formed within the first particles for display, within the second particles for display, and between the first and second particles for display, respectively.

It is also possible that the first polymeric dispersant and the second polymeric dispersant attached to the first and second particles for display each include a structure having a π electron, and a π electron stacking interaction is formed within the first particles for display, within the second particles for display, and between the first and second particles for display, respectively.

It is preferable, however, that no π-π electron stacking interaction is formed within a single particle (within a single molecule). The π-π electron stacking interaction is an intermolecular force formed between the structures having a π electron.

In this exemplary embodiment, each kind of polymeric dispersant to be attached to the particles for display has a different weight average molecular weight, and a π-π stacking interaction is formed between the particles for display or the like. Therefore, in a system in which at least two kinds of particles for display are dispersed, the voltage that applies an electric field at which the particles for display of each kind start to move can be set at different levels. The reason for this is presumed as follows.

In the particles for display (electrophoretic particles) that are attracted by the application of a voltage, the functional group having a π electron included in one particle (or a polymer that forms the particle) forms a π-π stacking interaction together with a functional group having a π electron included in the adjacent particles. This is considered to function as an interparticle attracting force.

The intensity of the π-π stacking interaction at this time can be controlled by the amount of the functional group having a π electron included in the particles. Therefore, it is presumed that the threshold voltage of the particles of different kinds can be set at different levels by controlling the amount of functional group having a π electron included in the particles of different kinds.

In this exemplary embodiment, the particles for display or the polymeric dispersant including a structure having a π electron preferably includes, as a component thereof, a copolymer including at least one kind of monomer having a functional group having a π electron, more preferably an aromatic monomer. Examples of the monomer having a functional group having a π electron include styrene, styrene sulfonic acid, vinyl naphthalene, phenoxyethylene glycol (meth)acrylate, phenoxy polyethylene glycol (meth)acrylate, and hydroxypheoxypropyl acrylate.

Next, the general structure of the particles for display will be described.

The particles for display are formed by including a colorant and a polymer, and other components as necessary. The particles for display may be polymer particles in which a colorant is dispersed or compounded, or particles formed of a colorant having a surface covered with a polymer.

The polymer has a basic group (hereinafter, a cationic group) or an acidic group (hereinafter, an anionic group) as a charging group.

The cationic group makes the particles positively chargeable, and examples thereof include an amino group, a quaternary ammonium group, and a salt of these groups.

The anionic group makes the particles negatively chargeable, and examples thereof include a phenol group, a carboxyl group, a carboxylate group, a sulfonic group, a sulfonate group, a phosphoric group, a phosphate group, a tetraphenyl boron group, and a salt of these groups.

The polymer having a charging group may be, for example, a homopolymer of a monomer having a charging group, or a copolymer of a monomer having a charging group and other monomer (monomer having no charging group).

Examples of the monomer having a charging group include a monomer having a cationic group (hereinafter, a cationic monomer) and a monomer having an anionic group (hereinafter, an anionic monomer).

Specific examples of the cationic monomer include (meth)acrylates having an aliphatic amino group, such as N,N-dimethylaminoethyl (meth)acrylate, N,N-diethylaminoethyl (meth)acrylate, N,N-dibutylaminoethyl (meth)acrylate, N,N-hydroxyethylaminoethyl (meth)acrylate, N-ethylaminoethyl (meth)acrylate, N-octyl-N-ethylaminoethyl (meth)acrylate, and N,N-dihexylaminoethyl (meth)acrylate; aromatic-substituted ethylene monomers having a nitrogen-containing group, such as dimethylaminostyrene, diethylaminostyrene, dimethylaminomethylstyrene and dioctylaminostyrene; nitrogen-containing vinyl ether monomers, such as vinyl-N-ethyl-N-phenylaminoethyl ether, vinyl-N-butyl-N-phenylaminoethyl ether, triethanolamine divinyl ether, vinyl diphenyl aminoethyl ether, N-vinyl hydroxyethyl benzamide, and m-aminophenyl vinyl ether; vinylamine; pyrroles such as N-vinyl pyrrole; pyrrolines such as N-vinyl-2-pyrroline and N-vinyl-3-pyrroline; pyrrolidines such as N-vinyl pyrrolidine, vinylpyrrolidine amino ether, and N-vinyl-2-pyrrolidone; imidazoles such as N-vinyl-2-methyl imidazole; imidazolines such as N-vinyl imidazoline, indoles such as N-vinyl indole, indolines such as N-vinyl indoline, carbazoles such as N-vinyl carbazole and 3,6-dibromo-N-vinyl carbazole, pyridines such as 2-vinyl pyridine, 4-vinyl pyridine and 2-methyl-5-vinyl pyridine, piperidines such as (meth)acrylic piperidine, N-vinyl piperidone and N-vinyl piperadine, quinolines such as 2-vinyl quinoline and 4-vinyl quinoline, pyrazoles such as N-vinyl pyrazole and N-vinyl pyrazoline, oxazoles such as 2-vinyl oxazole, and oxazines such as 4-vinyl oxazine and morpholinoethyl (meth)acrylate.

In view of versatility, the cationic monomer is preferably a (meth)acrylate having an aliphatic amino group such as N,N-dimethylaminoethyl (meth)acrylate and N,N-diethylaminoethyl (meth)acrylate. In particular, these monomers are preferably used in the form of a quaternary ammonium salt, before or after the polymerization. The quaternary ammonium salt may be obtained by allowing the monomer to react with an alkyl halide or a tosylate.

Examples of the anionic monomer include carboxylic acid monomers such as (meth)acrylic acid, crotonic acid, itaconic acid, maleic acid, fumaric acid, citraconic acid, anhydrides and monoalkyl esters of these monomers, and vinyl ethers having a carboxyl group such as carboxylethyl vinyl ether and carboxylpropyl vinyl ether;

sulfonic acid monomers such as styrene sulfonic acid, 2-acrylamide-2-methylpropane sulfonic acid, 3-sulfopropyl (meth)acrylic acid ester, bis-(3-sulfopropyl)-itaconic acid ester, a salt of these monomers, as well as other sulfonic acid monoesters such as 2-hydroxyethyl (meth)acrylic acid or a salt of these monomers; and phosphoric acid monomers such as vinyl phosphoric acid, vinyl phosphate, acid phosphoxyethyl (meth)acrylate, acid phosphoxypropyl (meth)acrylate, bis(methacryloyoxyethyl) phosphate, diphenyl-2-methacyloyloxyethyl phosphate, diphenyl-2-acryloyloxyethyl phosphate, dibutyl-2-methacryloyloxyethyl phosphate, dibutyl-2-acryloyloxyethyl phosphate, and dioctyl-2-(meth)acryloyloxyethyl phosphate.

The anionic monomer is preferably a monomer having (meth)acrylic acid or sulfonic acid, which is more preferably in the form of an ammonium salt before or after the polymerization. The ammonium salt may be obtained by allowing the monomer to react with a tertiary amine or a quaternary ammonium hydroxide.

Examples of the other monomer include a nonionic monomer such as (meth)acrylonitrile, alkyl (meth)acrylate, (meth) acrylamide, ethylene, propylene, butadiene, isoprene, isobutylene, N-dialkyl substituted (meth)acrylamide, styrene, styrene derivatives, vinyl carbazole, polyethylene glycol mono(meth)acrylate, vinyl chloride, vinylidene chloride, isoprene, butadiene, vinyl pyrrolidone, hydroxyethyl (meth) acrylate, and hydroxybutyl (meth)acrylate.

The copolymerization ratio of a monomer having a charging group to other monomer (monomer having no charging group) (monomer having a charging group: other monomer) by mole may be selected as appropriate according to the desired charge amount of the particles, and typically from the range of from 1:100 to 100:0.

The weight average molecular weight of the polymer is preferably from 1,000 to 1,000,000, more preferably from 10,000 to 200,000.

Examples of the colorant include organic or inorganic pigments, and oil-soluble dyes. Examples of known colorants include a magnetic powder of magnetite, ferrite or the like, carbon black, titanium oxide, magnesium oxide, zinc oxide, phthalocyanine copper cyano colorant, azo yellow colorant, azo magenta colorant, quinacridone magenta colorant, red colorant, green colorant, and blue colorant. Specific examples thereof include aniline blue, calco oil blue, chrome yellow, ultramarine blue, DuPont oil red, quinoline yellow, methylene blue chloride, phthalocyanine blue, malachite green oxalate, lamp black, rose bengal, C.I. pigment red 48:1, C.I. pigment red 122, C.I. pigment red 57:1, C.I. pigment yellow 97, C.I. pigment blue 15:1, and C.I. pigment blue 15:3. These colorants may be used alone or in combination.

The amount of the colorant to be compounded is preferably from 10 to 99% by weight, more preferably from 30 to 99% by weight, with respect to the amount of the polymer having a charging group.

Other components to be compounded in the particles include, for example, a charge control agent and a magnetic material.

The charge control agent may be a known product for use in electrophotographic toner, such as cetylpyridinium chloride, quaternary ammonium salts such as BONTRON P-51, BONTRON P-53, BONTRON E-84, and BONTRON E-81 (trade name, manufactured by Orient Chemical Industries, Ltd.), salicylic metal complexes, phenol condensates, tetraphenyl compounds, metal oxide particles, or metal oxide particles having a surface treated with a coupling agent.

The magnetic material may be an inorganic magnetic material or an organic magnetic material, which may have a color coating as necessary. A transparent magnetic material, particularly a transparent organic magnetic material is preferred since it does not affect the color of the pigment and has a specific gravity that is less than that of inorganic magnetic material.

Examples of the magnetic material having a color coating include the small-diameter colored magnetic powder described in Japanese Patent Application No. 2003-131420, having a color coating formed on a surface of the core magnetic particles. The color coating may be an opaque layer formed from a pigment or the like, but is preferably a light-interference thin film, for example, which is formed from a colorless material such as $SiO_2$ or $TiO_2$ and has a thickness corresponding to a light wavelength, and selectively reflects light of the specific wavelength as a result of light interference caused in the thin film.

<Method of Producing Particles for Display>

The method of producing particles for display according to the invention preferably includes, for example, (1) preparing a mixture of an ionic polymer, a colorant, a first solvent and a second solvent, the second solvent not being compatible with the first solvent, having a lower boiling point that the first solvent, and dissolving the ionic polymers, and then emulsifying the mixture while stirring; (2) removing the second solvent from the emulsified mixture and producing color particles (particles for display) including the ionic polymer and the colorant. In particular, by employing this so-called solvent evaporation method, particles for display having stable dispersibility and charging property may be obtained.

In this method, a dispersing medium for use in the display medium may be used as the first solvent so that the resultant first solvent may serve as the dispersing medium of the particle dispersion for display. In this way, the method of producing the particles for display can omit a process of washing and drying the particles, and the particle dispersion including the first solvent as the dispersing medium can be obtained in a simple process. It is of course possible to wash the particles (remove ionic impurities) or replace the dispersing medium in order to improve electric characteristics of the obtained particles or particle dispersion.

The method of producing the particles for display is not particularly limited to the above, and other known methods (such as a coacervation method, a dispersion-polymerization method, and a suspension-polymerization method) are also applicable.

In the following, each process of an example of the method of producing the particles for display employing a solvent evaporation method is described.

(1) Emulsification

In the emulsification process, two kinds of solution, one including a first solvent and the other including an ionic polymer, a colorant and a second solvent, are mixed and stirred to emulsify. The second solvent is not compatible with the first solvent and has a lower boiling point than the first solvent. Further, the second solvent dissolves the ionic polymer. Other materials than the above (such as a charge controlling agent or a pigment dispersant) may be included in the mixture to be emulsified, as necessary.

In this process, while stirring the above mixture, the second solvent having a low boiling point forms a dispersed phase in the form of droplets in a continuous phase of the first solvent having a high boiling point. In this case, the ionic polymer and the colorant are dissolved or dispersed in the second solvent.

In this process, each material may be mixed sequentially. However, for example, the emulsification is preferably conducted by preparing a mixture of the ionic polymer, the colorant and the second solvent, and then dispersing/mixing this mixture in the first solvent so that the mixture is dispersed in the form of particles in the first solvent.

The stirring is conducted by, for example, using a known stirring machine (such as a homogenizer, a mixer or an ultrasonic pulverizer). In order to suppress the temperature increase during the emulsification, the temperature of the mixture during the emulsification is preferably maintained in a range of from 0 to 50° C. The stirring speed of a homogenizer or a mixer for emulsification, the output power of ultrasonic pulverizer, the time period for emulsification, or the like, may be determined according to the desired particle diameter.

(First Solvent)

The first solvent is used as a poor solvent that forms a continuous phase in the mixture, and examples thereof include a paraffin-based hydrocarbon solvent, a silicone oil, and a petrol-based high-boiling point solvent such as a fluorine-derived liquid, preferably a silicone oil. However, the first solvent is not limited to the above.

Specific examples of the silicone oil include silicone oils having a hydrocarbon group bonded to a siloxane bond (such as dimethyl silicone oil, diethyl silicone oil, methylethyl silicone oil, methylphenyl silicone oil, and diphenyl silicone oil), and modified silicone oils (such as fluorine-modified silicone oil, amine-modified silicone oil, carboxyl-modified silicone oil, epoxy-modified silicone oil and alcohol-modified silicone oil). Among these, dimethyl silicone oil is particularly preferred from the viewpoint of its nature such as being highly safe, chemically stable and reliable over the long term, as well as having a high resistivity.

The viscosity of the silicone oil in an environment of 20° C. is preferably from 0.1 to 20 mPa·s, more preferably from 0.1 to 2 mPa·s. When the viscosity is within this range, the moving speed of the particles, i.e., the display speed, can be improved. The viscosity may be measured by using a viscometer (B-8L, trade name, manufactured by Tokyo Keiki, Inc.)

Examples of the paraffin-based hydrocarbon solvent include normal paraffin-based hydrocarbon solvents and isoparaffin-based hydrocarbon solvents having 20 or more carbon atoms (boiling point: 80° C. or more) from the viewpoint of safety, volatility or the like. Specific examples thereof include SHELLSOL 71 (trade name, manufactured by Showa Shell Sekiyu K.K.), ISOPAR O, ISOPAR H, ISOPAR K, ISOPAR L, ISOPAR G and ISOPAR M (trade name, manufactured by Exxon Mobil Corporation) and IP SOLVENT (trade name, manufactured by Idemitsu Kosan Co., Ltd.)

(Second Solvent)

The second solvent is used as a good solvent that forms a dispersed phase in the mixture. The second solvent is not compatible with the first solvent and has a lower boiling point than the first solvent. Further, the second solvent can dissolve the polymer having a charging group. The term "not compatible" here refers to a state in which two or more substance systems each remain independent without mixing with each other. The term "dissolved" here refers to a state in which the remaining of dissolved substance is not visually observed.

Specific examples of the second solvent include water, lower alcohols having carbon atoms of 5 or less (such as methanol, ethanol, propanol and isopropyl alcohol), tetrahydrofuran, acetone, and other organic solvents (such as toluene, dimethylformamide and dimethylacetoamide), and a mixture thereof. However, the second solvent is not limited to the above.

Since the second solvent is removed from the mixture system by heating or reducing the pressure, the second solvent is selected from those having a lower boiling point than that of the first solvent. The boiling point is preferably from 50 to 200° C., for example, more preferably from 50 to 150° C.

(2) Removal of Second Solvent

In this process, the second solvent is removed from the mixture that has been emulsified in the previous process. By removing the second solvent, the ionic polymer is allowed to precipitate in a state of including other materials therein, in the dispersed phase formed by the second solvent. Color particles are thus formed. The polymer that forms the particles may include other additives such as a pigment dispersant or a weathering stabilizer. For example, when a commercially available pigment dispersion including a polymeric substance for dispersing a pigment or a surfactant is used, the obtained color particles include these substances together with the polymer having a charging group. The thus obtained color particles are used as the particles for display.

Examples of the method of removing the second solvent include a method of heating the mixture and a method of reducing the pressure of the mixture, and these methods may be used in combination.

When the second solvent is removed by heating the mixture, the heating temperature is preferably from 30 to 200° C., for example, more preferably from 50 to 180° C. It is also possible to allow the reactive silicone-based polymer or reactive long-chain alkyl-based polymer to react with the surface of the particles by heating, while removing the second solvent.

When the second solvent is removed by reducing the pressure of the mixture, the pressure is preferably reduced to a range of from 0.01 to 200 mPa, more preferably from 0.01 to 20 mPa.

The method of producing the particles for display is not particularly limited to the above, and other known methods (such as a pulverization method, a coacervation method, a dispersion-polymerization method or a suspension-polymerization method). In these methods, a dispersing medium used for a display medium may be used as the solvent (remaining after the production process) so that the resultant may serve as the particle dispersing including the dispersing medium and the particles for display. In this way, the particle dispersion for display can be readily produced without conducting a process of washing or drying the particles to remove the solvent therefrom. Of course, washing of the particles or substitution of the dispersing medium may be conducted in order to improve the electric characteristics of the particles or the particle dispersion.

Examples of the method of attaching a polymeric dispersant to the particles for display include a coacervation method or a solvent evaporation method. One specific example of the method includes dispersing the obtained particles for display in the first solvent in which a polymeric dispersant is dispersed, dropping the second solvent in the first solvent and emulsifying the same, and then removing the first solvent to allow the polymeric dispersant to precipitate on the particles for display, thereby attaching to the surface of the particles for display. Preferable examples of the second solvent include water, isopropyl alcohol (IPA), methanol, ethanol, butanol, tetrahydrofuran, ethyl acetate and butyl acetate. Among these, water and isopropylalcohol (IPA) are preferred in view of achieving a dispersion stability and a charging property. Preferable examples of the first solvent include silicone oil and ISOPAR series (trade name).

The method of attaching the polymeric dispersant to the particles for display is not limited to the above.

Through the aforementioned processes, the particles for display and the particle dispersion for display can be obtained.

As necessary, an acid, an alkali, a salt, a dispersant, a dispersion stabilizer, a stabilizer such as an antioxidant or a UV absorber, an antibacterial agent, an antiseptic agent, or the like may be added to the obtained particle dispersion for display.

The obtained particles for display may include a charge control agent, such as an anionic surfactant, a cationic surfactant, an amphoteric surfactant, a nonionic surfactant, a fluorine-based surfactant, a silicone-based surfactant, a silicone-based cationic compound, a silicone-based anionic compound, a metal soap, an alkyl phosphate, or a succinimide.

Examples of the charge control agent include an ionic or nonionic surfactant, a block or graft copolymer having a lipophilic portion and a hydrophilic portion, a compound having a polymeric skeleton of a cyclic, stellate, or dendritic structure, a salicyclic metal complex, a catechol metal complex, a metal-containing bisazo dye, a tetraphenyl borate derivative, and a copolymer of a polymerizable macromer (such as SILAPLANE, trade name, manufactured by Chisso Corporation) and an anionic monomer or a cationic polymer.

Examples of the nonionic surfactant include polyoxyethylene nonyl phenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, and fatty acid alkylol amide.

Examples of the anionic surfactant include alkyl benzene sulfonate, alkyl phenyl sulfonate, alkyl naphthalene sulfonate, a higher fatty acid salt, a sulfate of higher fatty acid ester, and a sulfonate of higher fatty acid ester.

Examples of the cationic surfactant include a primary to tertiary amine salt, or a quaternary ammonium salt.

The charge control agents is preferably included in an amount of from 0.01 to 20% by weight, particularly preferably from 0.05 to 10% by weight, with respect to the solid content of the particles.

As necessary, the obtained particle dispersion for display may be diluted with the first solvent (including a dispersant as necessary) or the like.

The concentration of particles for display in the particle dispersion according to the invention may be appropriately selected according to the desired display characteristics, responsiveness or intended purposes thereof, but is preferably selected from 0.1 to 30% by weight. When particles of two or more colors are included in the particle dispersion, the total amount of these particles is preferably within the above range. When the concentration is less than 0.1% by weight, the display density may be too low, while when the concentration is more than 30% by weight, the display speed may decrease or aggregation of the particles may occur.

The particle dispersion for display according to the invention can be obtained by separately preparing the first particles for display (a first particle dispersion for display including the same) and the second particles for display (a second particle dispersion for display including the same), and then mixing the obtained first and second particle dispersions.

The particles for display and the particle dispersion for display according to the invention are applicable to a display medium employing an electrophoretic system, a photochromic medium (photochromic device) employing an electrophoretic system, a liquid toner for electrophotographic system employing a liquid development system, or the like.

Further, the system of an electrophoretic display medium or an electrophoretic photochromic medium (photochromic device) may be a system in which particles move in a vertical direction with respect to the electrode (substrate), a system in which particles move in a horizontal direction (so-called in-plane device), or a hybrid system in which these systems are combined.

<Display Medium and Display Device>

In the following, the display medium and the display device according to the invention will be described.

First Exemplary Embodiment

Figure 2A:
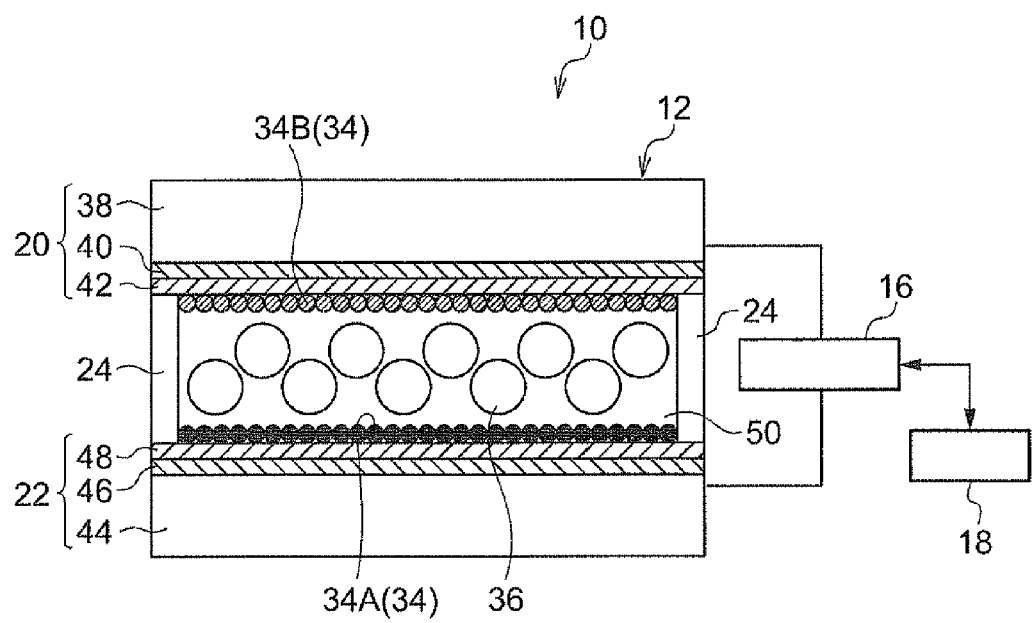
FIGS. 2A and 2B are schematic views showing how the particles move upon application of a voltage between the substrates of the display device according to the first exemplary embodiment of the invention.
Figure 2B:
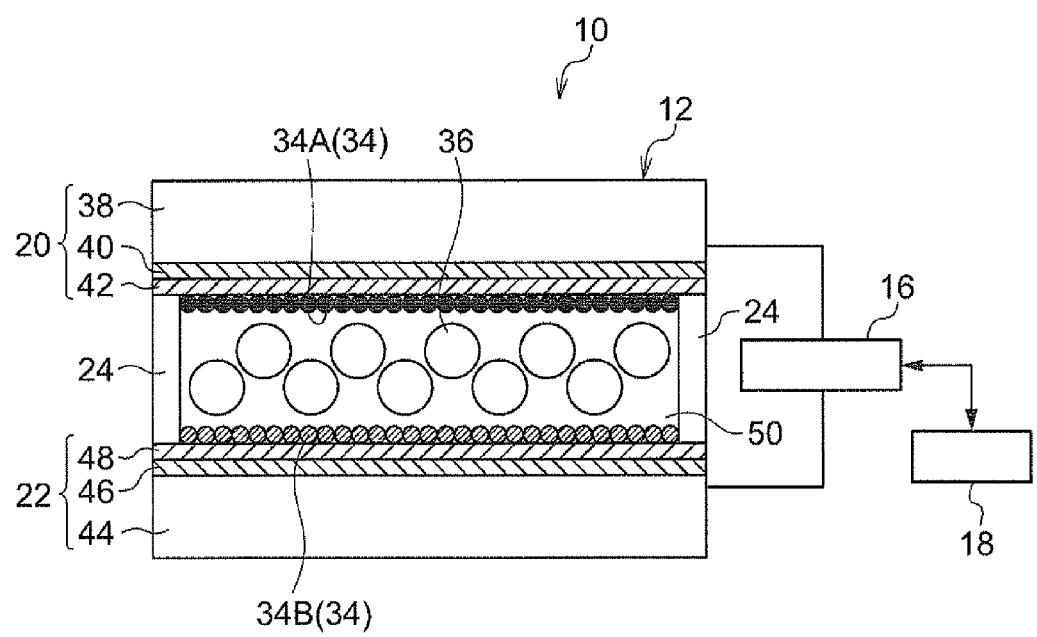

FIG. 1 is a schematic view of a display device according to the first exemplary embodiment. FIGS. 2A and 2B are schematic views showing how the particles move upon application of a voltage between the substrates of the display device according to the first exemplary embodiment of the invention.

Display device 10 according to the first exemplary embodiment includes display medium 12, and display medium 12 includes the particles for display dispersion according to the invention (dispersing medium 50 and particles 34). Specifically, the first particles for display are described as particles 34A and the second particles for display are described as particles 34B, respectively. Particles 34A and 34B have different colors and are charged to different polarities.

Although particles 34A and 34B are charged to different polarities in display device 10 according to this exemplary embodiment, these particles may be charged to the same polarity. In this case, voltages that apply an electric field at which particles of each kind start to move are set at different values.

Display device 10 includes, as shown in FIG. 1, a display medium 12, a voltage application unit 16 that applies a voltage to display medium 12, and a controller 18.

Display medium 12 includes a display substrate 20 that displays an image; a rear substrate 22 that is positioned opposite to display substrate 20 with a space therebetween; spacers 24 that maintain the substrates to be positioned with a specified space therebetween and divide the space between the substrates into plural cells; particles 34 included in each cell; and reflective particles 36 having a different optical reflection property than that of particles 34.

The cell as mentioned above refers to a space surrounded by display substrate 20, rear substrate 22, and spacers 24. A dispersing medium 50 is enclosed in the cell. Particles 34 are dispersed in dispersing medium 50, and move between display substrate 20 and rear substrate 22 through the gaps among reflective particles 36 in response to the intensity of an electric field formed in the cell.

It is also possible to design display medium 12 so that the display can be performed at each pixel, by providing spacers 24 to form a cell so as to correspond to each pixel of an image to be displayed.

For the purpose of simplification, this exemplary embodiment is described by referring to a drawing that shows only a single cell. In the following, details of each component will be described.

Display substrate 20 includes, on a support 38, a front electrode 40 and a surface layer 42 in this order. Rear substrate 22 includes, on a support 44, a rear electrode 46 and a surface layer 48 in this order.

Only display substrate 20, or both display substrate 20 and rear substrate 22 are transparent. In this exemplary embodiment, being transparent refers to having a transmittance with respect to visible rays of 60% or more.

Materials for support 38 and support 44 include glass and plastics such as polyethylene terephthalate resin, polycarbonate resin, acrylic resin, polyimide resin, polyester resin, epoxy resin, and polyether sulfone resin.

Materials for front electrode 40 and rear electrode 46 include oxides of indium, tin, cadmium, antimony or the like, composite oxides such as ITO, metals such as gold, silver, copper or nickel, and organic materials such as polypyrrole or polythiophene. Front electrode 40 and rear electrode 46 may be obtained by forming a material such as those into a single film, a mixed film or a composite film, by a method such as evaporation, sputtering or coating. The thickness of front electrode 40 and rear electrode 46 is typically from 100 to 2,000 angstroms when these electrodes are formed by evaporation or sputtering. Front electrode 40 and rear electrode 46 may be formed in a desired patterned manner by a known method such as etching that is performed to form conventional liquid crystal displays or printed boards. For example, front electrode 40 and rear electrode 46 may be formed in a matrix pattern or a striped pattern that enables passive matrix driving.

Front electrode 40 may be embedded in support 38, or rear electrode 46 may be embedded in support 44. In this case, the material for supports 38 and 44 is selected in accordance with the composition of each kind of particles 34.

Front electrode 40 and rear electrode 46 may be positioned outside display medium 12, separate from display substrate 20 and rear substrate 22, respectively.

In the above description, both display substrate 20 and rear substrate 22 are provided with an electrode (front electrode 40 and rear electrode 46). However, it is also possible to provide an electrode only to one substrate for performing active matrix driving.

In order to enable active matrix driving, a thin film transistor (TFT) may be provided to support 38 and support 44 to each pixel. The TFT is preferably formed on rear substrate 22 rather than on display substrate 20, for ease of forming a multilayer wiring or packaging.

When display medium 12 is driven in a passive matrix manner, configuration of display device (described later) including display medium 12 can be simplified, while when display medium 12 is driven in an active matrix manner using a TFT, display speed can be improved as compared with the passive matrix driving.

When front electrode 40 and rear electrode 46 are formed on support 38 and support 44, respectively, dielectric films as surface layers 42 and 48 may be formed on front electrode 40 and rear electrode 46, respectively, in order to prevent breakage of front electrode 40 and rear electrode 46 or leakage between the electrodes that causes attachment of particles 34.

Materials for surface layers 42 and 48 include polycarbonate, polyester, polystyrene, polyimide, epoxy, polyisocyanate, polyamide, polyvinyl alcohol, polybutadiene, polymethylmethacrylate, copolymerized nylon, UV-cured acrylic resin, and fluorocarbon resin.

Other than the aforementioned insulating materials, an insulating material in which a charge transporting substance is included is also applicable. Inclusion of a charge transporting substance may bring such effects as improving the charging property of particles due to charges injected to the particles, or stabilizing the amount of charges of the particles by allowing the charges to leak when the amount thereof is increased too much.

Examples of the charge transporting substance include hole transporting substances such as hydrazone compounds, stilbene compounds, pyrazoline compounds, and arylamine compounds; and electron transporting substances such as fluorenone compounds, diphenoquinone compounds, pyrane compounds, and zinc oxide.

A self-supporting resin having a charge transporting property is also applicable. Specific examples thereof include polyvinyl carbazole, and a polycarbonate obtained by polymerizing a specific dihydroxyarylamine and bischloroformate, as described in the U.S. Pat. No. 4,806,443.

The material for the dielectric film is selected in accordance with the composition of the particles, or the like. Since display substrate 20 needs to be transparent, the surface layer for display substrate 20 is preferably formed from a transparent material.

The material for surface layers 42 and 48 may be a polymeric dispersant used for the particle dispersion for display according to the invention. In this case, for similar assumptive reasons as described above concerning the particle dispersion for display according to the invention, a binding force is created between display substrate 22 or rear substrate 22 (surface layer 42 or surface layer 48) with respect to the particles for display having the same polarity, when these particles for display move close to these substrates, thereby achieving the display maintainability.

Spacers 24 that maintain a space between display substrate 20 and rear substrate 22 are formed so as not to impair the transparency of display substrate 20, and are formed from thermoplastic resin, thermosetting resin, electron beam-curing resin, photo-curing resin, rubber, metal, or the like.

Spacers 24 may be formed in an integrated manner with either display substrate 20 or rear substrate 22. In this case, spacers 24 may be formed by subjecting support 38 or support 44 to an etching treatment, laser treatment, pressing treatment using a predetermined pattern, or printing treatment.

In this case, spacers 24 may be formed on either side of display substrate 20 or rear substrate 22, or may be formed on both sides.

Spacers 24 may have a color or colorless, but is preferably colorless and transparent so as not to affect the image displayed on display medium 12. In this case, for example, spacers 24 are formed from a transparent polystyrene resin, polyester resin, or acrylic resin.

Spacers 24 in the form of particles are also preferably transparent. In this case, spacers 24 are formed from particles of a transparent polystyrene resin, polyester resin, or acrylic resin. Glass particles are also applicable.

Being transparent here refers to having a transmittance of 60% or more with respect to visible rays.

In the following, reflective particles 36 are described. Reflective particles 36 are particles that are not charged and have different optical reflection characteristics than that of particles 34, and function as a reflective member that displays a different color than that of particles 34. Further, reflective particle 36 serve as a spacer which allows particles 34 to move through the space between display substrate 20 and rear substrate 22 without inhibiting the movement of particles 34. Namely, each particle of particles 34 moves through the gaps among reflective particles 36 from the side of rear substrate 22 toward the side of display substrate 20, or from the side of display substrate 20 toward the side of rear substrate 22. The color of reflective particles 36 may be selected so as to be a background color, such as white or black. In this exemplary embodiment, reflective particles 36 are described as white particles, but the color of reflective particles 36 is not limited thereto.

Reflective particles 36 may be, for example, formed by dispersing a white pigment such as titanium oxide, silicon oxide or zinc oxide in a resin such as polystyrene, polyethylene, polypropylene, polycarbonate, PMMA, acrylic resin, phenol resin, formaldehyde condensate, or the like. When reflective particles 36 have a color other than white, a pigment or dye of a desired color may be included in the resin particles. The pigment or dye may be known ones used in printing inks or color toners, such as RGB or YMC colors.

Reflective particles 36 may be included between the substrates by, for example, an inkjet method. When reflective particles 36 are fixed, heat (and pressure as necessary) is applied after the inclusion of reflective particle 36 to melt the surface of the particles, while maintaining the gaps between the particles.

The size of the cell in display medium 12 has a close relationship with the definition of display medium 12, and the definition of the image displayed by display medium 12 can be increased by reducing the size of the cell. The cell typically has a length in a plane direction of display substrate 20 of from 10 µm to 1 mm.

Display substrate 20 and rear substrate 22 can be fixed to each other via spacers 24 using a combination of bolt and nut, a clamp, a clip, a flame for fixing the substrates, or the like. Alternatively, the substrates may be fixed to each other using an adhesive, or by performing hot-melting, ultrasonic bonding, or the like.

Display medium 12 having the aforementioned structure is applicable to media that can record an image or re-writing an image, such as bulletin boards, circulars, electronic black boards, advertisements, billboards, flash signals, electronic paper, electronic newspapers, electronic books, and document sheets for use in both copiers and printers.

As mentioned above, the display device according to this exemplary embodiment includes display medium 12, voltage application unit 16 that applies a voltage to display medium 12, and controller 18 (see FIG. 1).

Voltage application unit 16 is electrically connected to front electrode 40 and rear electrode 46. In the following, both of front electrode 40 and rear electrode 46 are described as being electrically connected to voltage application 16. However, it is also possible that one of these electrodes is grounded while the other is electrically connected to voltage application 16.

Voltage application unit 16 is connected to controller 18 such that voltage application unit 16 can give or receive signals.

Controller 18 may be a microcomputer including a CPU (central processing unit) that controls operation of the whole device, a RAM (random access memory) that temporarily records data of various kinds, and a ROM (read only memory) in which programs of various kinds, such as control program for controlling the whole device, are recorded.

Voltage application unit 16 applies a voltage to front electrode 40 and rear electrode 46 in accordance with instructions from controller 18.

In the following, the function of display device 10 will be described in accordance with the operation of controller 18.

In particles 34 included in display medium 12, particles 3413 are described as being negatively charged while particles 34A are described as being positively charged. Dispersing medium 50 is described as transparent, and reflective particles 36 are described as white. Namely, in this exemplary embodiment, display medium 12 displays a color of particles 34A or 34B according to the movement thereof, with a white background color.

First, an initial operation signal is output to voltage application unit 16. This signal indicates application of a voltage for a specified time, such that front electrode 40 serves as a negative electrode and rear electrode 46 serves as a positive electrode. When a voltage that is negative and not less than a threshold voltage at which the concentration stops changing is applied between the substrates, particles 34A that are negatively charged move toward the side of rear substrate 22, and reach rear substrate 22 (see FIG. 2A). On the other hand, particles 34B that are positively charged move toward the side of display substrate 20, and reach display substrate 20 (see FIG. 2A).

At this time, the color of display medium 12 seen from the side of display substrate 20 is a color of particles 34B with a white background color of reflective particles 36. Particles 34A are concealed by reflective particles 36, thereby making the color thereof to be hardly seen.

The time T1 required for the above process may be recorded in advance in a memory such as a ROM (not shown) in controller 18 as information that indicates the time for voltage application in the initial operation, so that this information is read out upon execution of the operation.

Subsequently, when a voltage having a polarity opposite to the previously applied voltage is applied between the electrodes such that front electrode 40 serves as a positive electrode and rear electrode 46 serves as a negative electrode, the negatively charged particles 34A move toward display substrate 20 to reach display substrate 20 (see FIG. 2B), while the positively charged particles 34B move toward rear substrate 22 to reach rear substrate 22 (see FIG. 2B).

At this time, the color of display medium 12 seen from the side of display substrate 20 is a black color of particles 34A with a white background color of reflective particles 36. Particles 34B are concealed by reflective particles 36, thereby making the color thereof to be hardly seen.

As described above, in display device 10 according to this exemplary embodiment, display is performed by the movement of particles 34 (particles 34A and particles 34B) toward front substrate 20 or rear substrate 22.

Second Exemplary Embodiment

Figure 3:
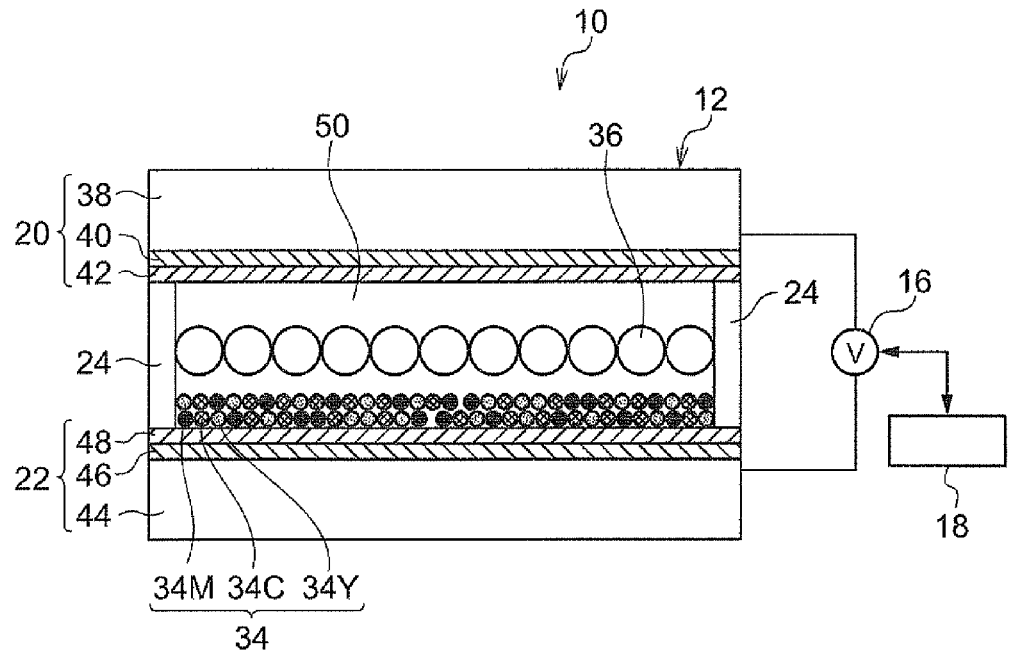
FIG. 3 is a schematic view of a display device according to a second exemplary embodiment of the invention.
Figure 4:
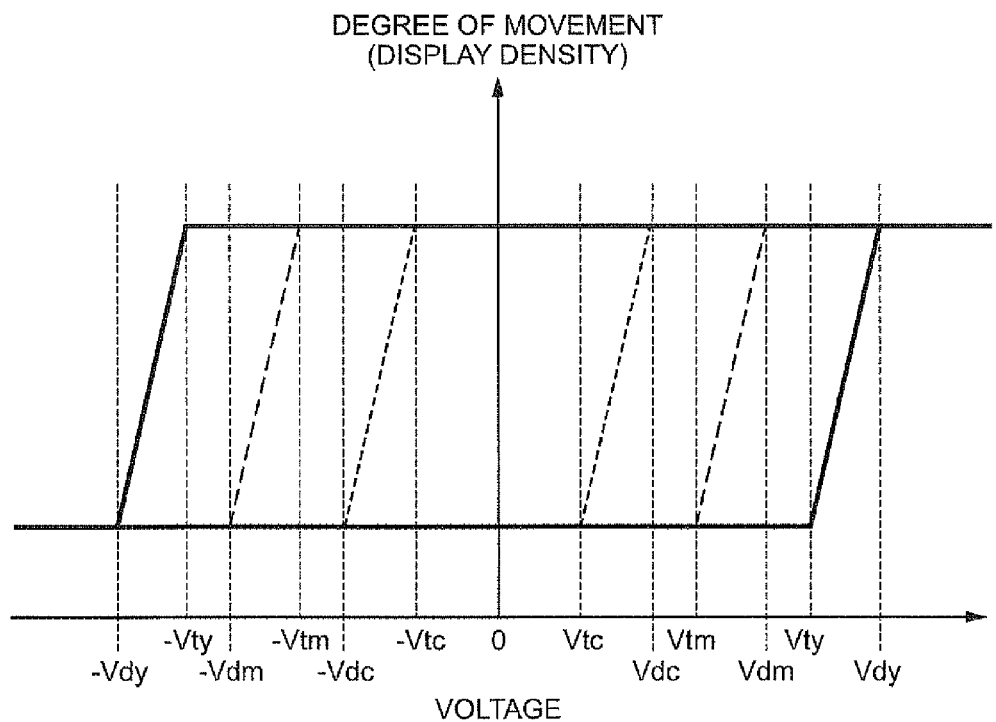
FIG. 4 is a diagram schematically showing the relationship between the voltage and the degree of movement of particles (display density)

In the following, a display device according to the second exemplary embodiment will be described. FIG. 3 is a schematic view of a display device according to the second exemplary embodiment of the invention, FIG. 4 is a diagram schematically showing the relationship between the voltage and the degree of movement of particles (display density), and FIG. 5 is a schematic view showing the relationship between the mode of voltage applied between the substrates of the display medium and the mode of movement of particles.

Display device 10 according to the second exemplary embodiment employs three kinds of particles 34. Further, display device 10 according to the second exemplary embodiment includes, as a particle dispersion for display including dispersing medium 50 and particles 34 for display medium 12, the particle dispersion for display according to the invention including the particles for display according to the first exemplary embodiment and a dispersing medium. Specifically, the first particle display and the second particles for display are used as yellow particles 34Y and magenta particles 34M, respectively, while particles for display of another kind are used as cyan particles 34C.

Display device 10 according to this exemplary embodiment includes, as shown in FIG. 3, display medium 12, voltage application unit 16 that applies a voltage to display medium 12, and controller 18.

Since display device 10 according to this exemplary embodiment has a similar structure to that of display device 10 according to the first exemplary embodiment, the same components are assigned the same reference numbers and detailed explanations thereof are omitted.

Display medium 12 includes display substrate 20, rear substrate 22 that is positioned opposite to display substrate 20 with a gap therebetween, spacers 24 that retains these substrates to be positioned via a predetermined space and defines the space between the substrates into multiple cells, particles 34 included in each cell, and reflective particles 36 having an optical reflection characteristics that is different from that of particles 34.

The surfaces of display substrate 20 and rear substrate 22 facing each other are charge-treated as with the case of the first exemplary embodiment, and surface layers 42 and 48 are provided on each of the substrate surfaces.

In this exemplary embodiment, two or more kinds of particles 34 having different colors are dispersed in dispersing medium 50.

In this exemplary embodiment, yellow particles 34Y having a yellow color, magenta particles 34M having a magenta color and cyan particles 34C having a cyan color are dispersed in the dispersing medium as particles 34. However, particles 34 are not limited to these three colors.

Particles 34 move between the substrates in an electrophoretic manner, and the particles of different colors move in response to an electric field at different absolute values of voltage. Namely, yellow particles 34Y, magenta particles 34M and cyan particles 34C move upon application of a voltage in a range that is different from each other.

Particles 34 including multiple kinds of particles that move in response to an electric field at different absolute values of voltage can be obtained by preparing particle dispersions each containing particles having different charge amounts, and then mixing these particle dispersions. The charge amount of the particles can be adjusted by, for example, changing the amount of materials for particles 34 as described in the first exemplary embodiment, such as a charge control agent or a magnetic powder, or changing the type or concentration of the resin that forms the particles.

As mentioned above, display medium 12 according to this exemplary embodiment includes three kinds of particles 34 dispersed in dispersing medium 50, i.e., yellow particles 34Y, magenta particles 34M and cyan particles 34C. Particles 34 of different colors move in response to an electric field upon application of a voltage at different absolute values.

In this exemplary embodiment, the absolute value of voltage at which magenta particles 34M start to move is defined as |Vtm|, the absolute value of voltage at which cyan particles 34C start to move is defined as |Vtc|, and the absolute value of voltage at which yellow particles 34Y start to move is defined as |Vty|, respectively. Further, the absolute value of maximum voltage at which substantially all of magenta particles 34M move is defined as |Vdm|, the absolute value of maximum voltage at which substantially all of cyan particles 34C move is defined as |Vdc|, and the absolute value of maximum voltage at which substantially all of yellow particles 34Y move is defined as Vdy.

In the following, the absolute values of Vtc, −Vtc, Vdc, −Vdc, Vtm, −Vtm, Vdm, Vdm, Vty, −Vty, Vdy and −Vdy satisfy the relationship of |Vtc|<|Vdc|<|Vtm|<|Vdm|<|Vty|<|Vdy|.

Specifically, as shown in FIG. 4, for example, particles 34 of three kinds are charged to the same polarity and are dispersed in dispersing medium 50, and the range of absolute value of voltage at which cyan mobile particle 34C move |Vtc≦Vc≦Vdc| (absolute values between Vtc and Vdc), the range of absolute value of voltage at which magenta particles 34M move |Vtm≦Vm≦Vdm| (absolute values between Vtm and Vdm), and the range of absolute value of voltage at which yellow particles 34Y move |Vty≦Vy≦Vdy| (absolute values between Vty and Vdy) are set in this order such that these ranges do not overlap each other.

Further, in order to move particles 34 of each color independently from each other, the absolute value of maximum voltage at which substantially all of cyan particles 34C move is less than the range of absolute value of voltage at which magenta particles 34M move |Vtm≦Vm≦Vdm| (absolute values between Vtm and Vdm) and the range of absolute value of voltage at which yellow particles 34Y move |Vty≦Vy≦Vdy| (absolute values between Vty and Vdy).

Moreover, the absolute value of maximum voltage at which substantially all of magenta particles 34M move is less than the range of absolute value of voltage at which yellow particles 34Y move |Vty≦Vy≦Vdy| (absolute values between Vty and Vdy).

Therefore, in this exemplary embodiment, particles 34 of each color can be independently driven by setting the ranges of voltage at which particles 34 of each color move so as not to overlap each other.

The range of voltage at which particles 34 move is from a voltage at which particles start to move to a voltage at which the display density stops to change (saturated) even when the amount of voltage and application time thereof are further increased.

Further, the maximum voltage at which substantially all of particles 34 move is a voltage at which the display density stops to change (saturated) even when the amount of voltage and application time thereof are further increased since the start of movement.

The term "substantially all" includes the situation that part of particles 34 of each color have different characteristics that do not contribute to the display characteristics due to variation in characteristics of particles 34 of each color.

The "display density" refers to a density at which the density per unit of voltage stops changing (saturated), and is determined by measuring an optical density (OD) of color density at the display side, using a reflective densiometer manufactured by X-Rite, Incorporated, while applying a voltage and changing the voltage between the substrates in a direction of increasing the density as measured (increasing or decreasing the voltage for application) even when the amount of voltage and application time thereof are increased.

In display medium 12 according to this exemplary embodiment, when a voltage is applied between display substrate 20 and rear substrate 22 and gradually increased from 0V to exceed +Vtc, display density starts to change due to the movement of cyan particles 34C. When the voltage is further increased to +Vdc, the display density due to the movement of cyan particles 34C stops changing.

When the voltage is further increased to exceed +Vtm, display density starts to change due to the movement of magenta particles 34M. When the voltage is further increased to +Vdm, the display density due to the movement of magenta particles 34M stops changing.

When the voltage is further increased to exceed +Vty, display density starts to change due to the movement of yellow particles 34Y. When the voltage is further increased to +Vdy, display density due to the movement of yellow particles 34Y stops changing.

Conversely, when a voltage of minus polarity is applied between display substrate 20 and rear substrate 22 and the absolute value of the voltage is gradually increased from 0V to exceed −Vtc, display density starts to change due to the movement of cyan mobile particle 34C. When the absolute value of voltage is further increased to −Vdc, the display density due to the movement of cyan particles 34C stops changing.

When the absolute value of minus voltage is further increased to exceed −Vtm, display density starts to change due to the movement of magenta particles 34M. When the absolute value of voltage is further increased to −Vdm, the display density due to the movement of magenta particles 34M stops changing.

When the absolute value of minus voltage is further increased to exceed −Vty, display density starts to change due to the movement of yellow particles 34Y. When the absolute value of voltage is further increased to −Vdy, the display density due to the movement of yellow particles 34Y stops changing.

Accordingly, in this exemplary embodiment, as shown in FIG. 4, when a voltage in a range of from −Vtc to +Vtc (|Vtc| or less) is applied between display substrate 20 and rear substrate 22, movement of cyan particles 34C, magenta particles 34M and yellow particles 34Y does not occur at such a level that the display density in display medium 12 changes. When a voltage having an absolute value that is more than +Vtc or −Vtc is applied between the substrates, cyan particles 34C (among cyan particles 34C, magenta particles 34M and yellow particles 34Y) start to move at such a level that causes changes in display density in display medium 12, and when a voltage having an absolute value that is more than +Vdc or −Vdc is applied between the substrates, the display density per unit voltage stops changing.

Further, when a voltage in a range of from −Vtm to +Vtm (|Vtm| or less) is applied between display substrate 20 and rear substrate 22, movement of magenta particles 34M and yellow particles 34Y does not occur at such a level that the display density in display medium 12 changes. When a voltage having an absolute value that is more than +Vtm or −Vtm is applied between the substrates, magenta particles 34M (among magenta particles 34M and yellow particles 34Y) start to move at such a level that causes changes in display density in display medium 12, and when a voltage having an absolute value of |Vdm| or more is applied between the substrates, the display density stops changing.

Further, when a voltage in a range of from −Vty to +Vty (|Vty| or less) is applied between display substrate 20 and rear substrate 22, movement of yellow particles 34Y does not occur at such a level that the display density in display medium 12 changes. When a voltage having an absolute value that is more than +Vty or −Vty is applied between the substrates, yellow particles 34Y start to move at such a level that causes changes in display density in display medium 12, and when a voltage having an absolute value of |Vdy| or more is applied between the substrates, the display density stops changing.

Subsequently, the mechanism of how the particles move when an image is displayed in display medium 12 will be described with reference to FIG. 5.

For example, display medium 12 includes yellow particles 34Y, magenta particles 34M and cyan particles 34C as explained with reference to FIG. 4 as particles 34 of plural kinds.

In the following, the voltage to be applied between the substrates that is more than an absolute value at which yellow particles 34Y start to move but not more than a maximum voltage at which substantially all of yellow particles 34Y move is referred to as "voltage L", the voltage to be applied between the substrates that is more than an absolute value at which magenta particles 34M start to move but not more than a maximum voltage at which substantially all of magenta particles 34M move is referred to as "voltage M", and the voltage to be applied between the substrates that is more than an absolute value at which cyan particles 34C start to move but not more than a maximum voltage at which substantially all of cyan particles 34C move is referred to as "voltage S".

When the voltage applied between the substrates is higher at the side of display substrate 20 than the side of rear substrate 22 is applied between the substrates, the above voltages are referred to as "+voltage L", "+voltage M" and "+voltage S", respectively. When the voltage applied between the substrates is higher at the side of rear substrate 22 than the side of display substrate 20, the above voltages are referred to as "−voltage L", "−voltage M" and "−voltage S", respectively.

As shown in FIG. 5, for example, all of magenta particles 34M, cyan particles 34C and yellow particles 34Y are positioned at the side of rear substrate 22, and a white color is displayed at the initial state (see (A)). When +voltage L is applied between display substrate 20 and rear substrate 22 at this initial state, all of magenta particles 34M, cyan particles 34C and yellow particles 34Y move to the side of display substrate 20. These particles remain at the side of display substrate 20 when the voltage application is stopped at this state, thereby exhibiting a black color formed by subtractive color mixing of magenta, cyan and yellow (see (B)).

Subsequently, when −voltage M is applied between display substrate 20 and rear substrate 22 in the state of (B), magenta particles 34M and cyan particles 34C move to the side of rear substrate 22. As a result, only yellow particles 34Y remain at the side of display substrate 20, thereby exhibiting a yellow color (see (C)).

Further, when +voltage S is applied between display substrate 20 and rear substrate 22 in the state of (C), cyan particles 34C move to the side of display substrate 22. As a result, yellow particles 34Y and cyan particles 34C are positioned at the side of display substrate 20, thereby exhibiting a green color formed by subtractive color mixing of cyan and yellow (see (D)).

When −voltage S is applied between display substrate 20 and rear substrate 22 in the state of (B), cyan particles 34C move to the side of rear substrate 20. As a result, yellow particles 34Y and magenta particles 34M are positioned at the side of display substrate 20, thereby exhibiting a red color formed by subtractive color mixing of yellow and magenta (see (I)).

When +voltage M is applied between display substrate 20 and rear substrate 22 in the state of (A), magenta particles 34M and cyan particles 34C move to the side of display substrate 20. As a result, magenta particles 34M and cyan particles 34C are positioned at the side of display substrate 20, thereby exhibiting a blue color formed by subtractive color mixing of magenta and cyan (see (E)).

When −voltage S is applied between display substrate 20 and rear substrate 22 in the state of (E), cyan particles 34C move to the side of rear substrate 22. As a result, only magenta particles 34M are positioned at the side of display substrate 20, thereby exhibiting a magenta color (see (F)).

When −voltage L is applied between display substrate 20 and rear substrate 22 in the state of (F), magenta particles 34M move to the side of rear substrate 22. As a result, no particles are positioned at the side of display substrate 20, thereby exhibiting a white color of reflective particles 36 (see (G)).

When +voltage S is applied between display substrate 20 and rear substrate 22 in the initial state of (A), cyan particles 34C move to the side of display substrate 20. As a result, cyan particles 34C are positioned at the side of display substrate 20, thereby exhibiting a cyan color (see (H)).

When −voltage L is applied between display substrate 20 and rear substrate 22 in the state of (I), all of particles 34 move to the side of rear substrate 22. As a result, no particles are positioned at the side of display substrate 20, thereby exhibiting a white color of reflective particles 36 (see (G)).

Similarly, when −voltage L is applied between display substrate 20 and rear substrate 22 in the state of (D), all of particles 34 move to the side of rear substrate 22. As a result, no particles are positioned at the side of display substrate 20, thereby exhibiting a white color of reflective particles 36 (see (G)).

In this exemplary embodiment, a voltage corresponding to each kind of particles 34 is applied between the substrates. Therefore, desired particles can be selectively moved in response to an electric field formed by the voltage, migration of particles of other colors in dispersing medium 50 can be suppressed, thereby suppressing mixing of an undesired color. As a result, a color can be displayed while suppressing image degradation of display medium 12. Further, a vivid color can be displayed as long as mobile particle 34 of different colors move upon application of a voltage having different absolute values, even if the ranges of the voltage overlap each other. However, when the ranges of voltage do not overlap each other, mixing of colors can be more suppressed and a more vivid color can be displayed.

Further, by dispersing particles 34 of cyan, magenta and yellow in dispersing medium 50, colors of cyan, magenta, yellow, blue, red, green and black can be displayed and, for example, a white color can be displayed by using reflective particles 36 having a white color, thereby enabling the display of a specific color.

As mentioned above, in display device 10 according to this exemplary embodiment, the display can be performed by the movement of particles 34 toward display substrate 20 or rear substrate 22.

EXAMPLES

In the following, the invention will be described in further details with reference to the Examples, but the invention is not limited thereto.

Example A1

Preparation of Cyan Particles (and Dispersion Thereof)

A polymeric dispersant P1 having an acidic group is prepared in the following manner. A copolymer of a vinyl monomer having a polysiloxane structure (SILAPLANE, manufactured by Chisso Corporation, trade name: FM-0711, Mn: 1,000) and acrylic acid (molar ratio: 20/80) is synthesized by an ordinary radical solution polymerization method using isopropyl alcohol as a polymerization solvent. After the completion of polymerization, the solvent is removed from the solution, and 3 parts by weight of the remaining is dissolved in 97 parts by weight of dimethyl silicone oil (trade name: KF-96-2CS, manufactured by Shin-Etsu Chemical Co., Ltd.), thereby preparing a solution A1 (continuous phase) including polymeric dispersant P1.

Subsequently, a copolymer of acrylamide and dimethylaminopropyl acrylamide (molar ratio: 5/5) is synthesized by an ordinary radical solution polymerization method. A polymer α having a charging group (basic group) is thus obtained.

1 part by weight of polymer α having a charging group (basic group), 5 parts by weight of a cyan pigment dispersion as a colorant (trade name: EMACOL, manufactured by Sanyo Color Works, Ltd., pigment solid content: 20 parts by weight equivalent) and 85 parts by weight of water as a good solvent are mixed and a solution B (dispersed phase) is prepared. 80 parts by weight of solution A1 and 20 parts by weight of solution B are mixed and emulsified using an ultrasonic homogenizer (trade name: UH-600S, manufactured by SMT Co., Ltd.) for 10 minutes.

The obtained emulsion is placed in a recovery flask, and the water (good solvent) is removed therefrom by heating (65° C.) and reducing the pressure (10 mPa) with an evaporator while stirring. A particle dispersion in which cyan particles (particles for display) to which a polymeric dispersant is attached are dispersed in silicone oil is thus obtained.

The average particle size of the obtained cyan particles as measured by using a dynamic light-scattering particles size analyzer (trade name: FPAR 1000, manufactured by Otsuka Electronics Co., Ltd.) is 780 nm.

The charge polarity of the cyan particles is determined from the direction in which the particles move when the particle dispersion is enclosed between the pair of electrode substrates and a direct voltage is applied thereto. As a result, the cyan particles are positively charged.

Preparation of Magenta Particles (and Dispersion Thereof)

A polymeric dispersant P2 having a basic group is prepared in the following manner. A copolymer of FM-0711 and dimethylaminopropyl acrylamide (molar ratio: 30/70) is synthesized by an ordinary radical solution polymerization method, using isopropyl alcohol as a polymerization solution. After the completion of polymerization, the solvent is removed from the solution, and 3 parts by weight of the remaining is dissolved in 97 parts by weight of dimethyl silicone oil (trade name: KF-96-2CS, manufactured by Shin-Etsu Chemical Co., Ltd.), thereby preparing a solution A2 (continuous phase) including polymeric dispersant P2.

Subsequently, a copolymer of acrylamide and acrylic acid (molar ratio: 5/5) is synthesized by an ordinary radical solution polymerization method. A polymer β having a charging group (acidic group) is thus obtained.

1 part by weight of polymer β having a charging group (acidic group), 5 parts by weight of a magenta pigment dispersion as a colorant (trade name: EMACOL, manufactured by Sanyo Color Works, Ltd., pigment solid content: 20 parts by weight equivalent) and 85 parts by weight of water as a good solvent are mixed and a solution B (dispersed phase) is prepared. 80 parts by weight of solution A2 and 20 parts by weight of solution B are mixed and emulsified using an ultrasonic homogenizer (trade name: UH-600S, manufactured by SMT Co., Ltd.) for 10 minutes.

The obtained emulsion is placed in a recovery flask, and the water (good solvent) is removed therefrom by heating (65° C.) and reducing the pressure (10 mPa) with an evaporator while stirring. A particle dispersion in which magenta particles (particles for display) to which a polymeric dispersant is attached are dispersed in silicone oil is thus obtained.

The average particle size of the obtained cyan particles as measured by using a dynamic light-scattering particles size analyzer (trade name: FPAR 1000, manufactured by Otsuka Electronics Co., Ltd.) is 287 nm.

The charge polarity of the magenta particles is determined from the direction in which the particles move when the particle dispersion is enclosed between the pair of electrode substrates and a direct voltage is applied thereto. As a result, the magenta particles are negatively charged.

Preparation of Mixed Particle Dispersion 0.1 parts by weight of the magenta particle dispersion (solid content: 0.1 parts by weight) and 0.1 parts by weight of the cyan particle dispersion (solid content: 0.1 parts by weight) thus obtained above are mixed, and a mixed particle dispersion is prepared.

Example A2

Cyan particles and magenta particles (and dispersions thereof) are prepared in a similar manner to Example 1, except that the polymeric dispersant is changed as indicated in Table 1, and a mixed particle dispersion is prepared in a similar manner to Example 1. Polymeric dispersants P1 and P2 having different values of molecular weight from those as prepared in Example 1 are obtained by changing the amount of the initiator.

Example A3

Yellow particles (and a dispersion thereof) are prepared in accordance with the following process, and 0.1 parts by weight of the same (solid content: 0.1 parts by weight) is added to the mixed particle dispersion as prepared in Example 1. A mixed particle dispersion including three kinds of particle dispersions is thus obtained.

A polymeric dispersant having a basic group is prepared from the same composition as P2, using the polymerization solvent in an amount of 3 times more. After the completion of polymerization, the solvent is removed from the solution and 3 parts by weight of the remaining is dissolved in 97 parts by weight of dimethyl silicone oil (trade name: KF-96-2CS, manufactured by Shin-Etsu Chemical Co., Ltd.), thereby preparing a solution A3 (continuous phase).

Subsequently, a copolymer of acrylamide and acrylic acid (molar ratio: 3/7) is synthesized by an ordinary radical solution polymerization method. A polymer γ having a charging group (acidic group) is thus obtained.

1 part by weight of polymer γ having a charging group (acidic group), 5 parts by weight of a yellow pigment dispersion as a colorant (trade name: EMACOL, manufactured by Sanyo Color Works, Ltd., pigment solid content: 20 parts by weight equivalent) and 85 parts by weight of water as a good solvent are mixed and a solution B (dispersed phase) is prepared. 80 parts by weight of solution A3 and 20 parts by weight of solution B are mixed and emulsified using an ultrasonic homogenizer (trade name: UH-600S, manufactured by SMT Co., Ltd.) for 10 minutes.

The obtained emulsion is placed in a recovery flask, and the water (good solvent) is removed therefrom by heating (65° C.) and reducing the pressure (10 mPa) with an evaporator, while stirring. A particle dispersion in which magenta particles (particles for display) to which a polymeric dispersant is attached are dispersed in silicone oil is thus obtained.

The average particle size of the obtained cyan particles as measured by using a dynamic light-scattering particles size analyzer (trade name: FPAR 1000, manufactured by Otsuka Electronics Co., Ltd.) is 287 nm.

The charge polarity of the magenta particles is determined from the direction in which the particles move when the particle dispersion is enclosed between the pair of electrode substrates and a direct voltage is applied thereto. As a result, the magenta particles are negatively charged.

Comparative Example A1

A mixed particle dispersion is prepared in a similar manner to Example 1, except that the polymeric dispersant used for the cyan particles and the magenta particles (and the dispersions thereof) is changed as indicated in Table 1.

Then, yellow particles (and a dispersion thereof) are prepared in accordance with the following process, and 0.1 parts by weight of the same (solid content: 0.1 parts by weight) are added to the mixed particle dispersion. A mixed particle dispersion including three kinds of particle dispersion is thus obtained.

A polymeric dispersant having a basic group is prepared from the same composition as P2 using the polymerization solvent in an amount of 1.2 times more. After the completion of polymerization, the solvent is removed from the solution and 3 parts by weight of the remaining is dissolved in 97 parts by weight of dimethyl silicone oil (trade name: KF-96-2CS, manufactured by Shin-Etsu Chemical Co., Ltd.), thereby preparing a solution A4 (continuous phase).

Subsequently, a copolymer of acrylamide and acrylic acid (molar ratio: 3/7) is synthesized by an ordinary radical solution polymerization method. A polymer γ having a charging group (acidic group) is thus obtained.

1 part by weight of polymer γ having a charging group (acidic group), 5 parts by weight of a yellow pigment dispersion as a colorant (trade name: EMACOL, manufactured by Sanyo Color Works, Ltd., pigment solid content: 20 parts by weight equivalent) and 85 parts by weight of water as a good solvent are mixed and a solution B (dispersed phase) is prepared. 80 parts by weight of solution A4 and 20 parts by weight of solution B are mixed and emulsified using an ultrasonic homogenizer (trade name: UH-600S, manufactured by SMT Co., Ltd.) for 10 minutes.

The obtained emulsion is placed in a recovery flask, and the water (good solvent) is removed therefrom by heating (65° C.) and reducing the pressure (10 mPa) with an evaporator, while stirring. A particle dispersion in which magenta particles (particles for display) to which a polymeric dispersant is attached are dispersed in silicone oil is thus obtained.

The average particle size of the obtained cyan particles as measured by using a dynamic light-scattering particles size analyzer (trade name: FPAR 1000, manufactured by Otsuka Electronics Co., Ltd.) is 287 nm.

The charge polarity of the magenta particles is determined from the direction in which the particles move when the particle dispersion is enclosed between the pair of electrode substrates and a direct voltage is applied thereto. As a result, the magenta particles are negatively charged.

Display Medium

Preparation of Display Medium

A display medium having a similar structure to that as described in the first exemplary embodiment is produced (FIG. 1).

To a glass substrate having a thickness of 0.7 mm, an electrode having a thickness of 50 nm is formed by sputtering ITO. To this rear substrate of ITO/glass structure, a surface layer is formed using a photosensitive polyimide varnish (trade name: PROBIMIDE 7005, manufactured by Fujifilm Electronic Materials Co., Ltd.). Thereafter, the surface layer is exposed to light and subjected to wet etching, thereby forming a spacer of 100 μm in height and 20 μm in width.

After forming an adhesive layer (not shown) on the spacer, the space formed by the spacer is filled with white particles (reflective particles) as prepared below and the particle dispersion for display as prepared in the above process. Then, a display substrate having an ITO/glass structure and a surface layer formed thereon as prepared in a similar manner to the rear substrate is attached to the rear substrate such that the surface layers on both substrates face each other. The display medium is thus obtained.

When a certain value of voltage is applied to the electrodes such that the electrode formed on the display substrate is positive and the electrode formed on the rear electrode is negative, the negatively charged magenta particles move toward the display substrate while the positively charged cyan particles move toward the rear substrate, in response to an electric field formed by the applied voltage. As a result, the display medium displays a magenta color.

Subsequently, when a certain value of voltage is applied to the electrodes such that the electrode formed on the display substrate is negative and the electrode formed on the rear substrate is positive, the negatively charged magenta particles move toward the rear substrate while the positively cyan particles move toward the display substrate, in response to an electric field formed by the applied voltage. As a result, the display medium displays a cyan color.

In Example A3 and Comparative Example A1, in which three kinds of particle dispersion are mixed, the movement of the magenta particles and the yellow particles, both being negatively charged, can be controlled by changing the voltage level to be applied between the display electrode and the rear electrode.

The color display is conducted in Examples A1 to A3 without causing color mixing. In Comparative Example A1, particles of different colors move together, thereby displaying a mixed color.

Preparation of White Particles

Preparation of Dispersion A

Dispersion A is prepared by mixing the following components and dispersing the same in a ball mill using zirconia beads having a diameter of 10 mm for 20 hours.
<Components>

| | |
|---|---|
| Cyclohexyl methacrylate | 53 parts by weight |
| Titanium oxide 1 (white pigment) (Primary particle diameter: 0.3 μm, TIPAQUE CR63, manufactured by Ishihara Sangyo Kaisha, Ltd.) | 45 parts by weight |
| Cyclohexane | 5 parts by weight |

Preparation of Calcium Carbonate Dispersion B

Calcium carbonate dispersion B is prepared by mixing the following components and dispersing the same in a ball mill in a similar manner to the above process.
<Components>

| | |
|---|---|
| Calcium carbonate | 40 parts by weight |
| Water | 60 parts by weight |

Preparation of Mixed Solution C

Mixed solution C is prepared by mixing the following components and degassing the same using an ultrasonic machine, and then stirring the same using an emulsifier.
<Components>

| | |
|---|---|
| 2% by weight aqueous solution of carboxymethyl cellulose (CELLOGEN, trade name, manufactured by Dai-ichi Kogyo Seiyaku Co., Ltd.) | 4.3 g |
| Calcium carbonate dispersion B | 8.5 g |
| 20% by weight salt water | 50 g |

35 g of dispersion A, 1 g of divinylbenzene, 0.35 g of AIBN (azobisisobutylonitrile) are measured and thoroughly mixed, and then degassed for 10 minutes using an ultrasonic machine. The resultant is added to mixed solution C and emulsified using an emulsifier. The obtained emulsion is placed in a bottle and sealed with a silicone cap, and then the content of the bottle is thoroughly degassed while reducing the pressure and filled with a nitrogen gas, using a syringe needle. This is allowed to react at 65° C. for 15 hours to produce particles. After cooling the same, the obtained dispersion is placed in a freeze dry machine and maintained at −35° C. and 0.1 Pa for two days to remove the cyclohexane. The obtained particle powder is dispersed in ion exchange water and the calcium carbonate is allowed to decompose with hydrochloric acid water, and then filtered. The resultant is washed with a sufficient amount of distilled water, and filtered with nylon sieves having an opening of 20 μm and 25 μm, respectively. White particles having a volume average particle size of 20 μm are thus obtained. These particles are used as the white particles (reflective particles).

Evaluation

Voltage at which Particles Start to Move

The value of a voltage to be applied between the electrodes at which the particles in the obtained mixed particle dispersion start to move is examined.

Specifically, two transparent glass electrodes in the form of a strip (1 cm×5 cm) are positioned to face each other via a spacer (100 μm in thickness) therebetween. The mixed particle dispersion is injected from the side of this electrode assembly. At first, a direct voltage is applied to move the electrophoretic particles of each kind to the side of display electrode or rear electrode. At this time, the color of electrophoretic particles located at the side of display electrode is observed at the display electrode side, and the color of electrophoretic particles located at the side of rear electrode is observed at the rear electrode side. Thereafter, while applying a triangle wave (0.5 V/see), the intensity from a side portion of transparent glass is measured. The voltage at which the color starts to change is determined as a threshold voltage (the voltage at which particles start to move). The results are shown in Table 1.

TABLE 1

| | Cyan particles | | | Magenta particles | | | Yellow particles | | |
|---|---|---|---|---|---|---|---|---|---|
| | | Polymeric dispersant | Voltage at | | Polymeric dispersant | Voltage at | | Polymeric dispersant | Voltage at |
| | Type | Weight average molecular weight | which particles start to move | Type | Weight average molecular weight | which particles start to move | Type | Weight average molecular weight | which particles start to move |
| Ex. A1 | P1 | 70,000 | 3.2 V | P2 | 240,000 | 1.9 V | — | — | — |
| Ex. A2 | P1 | 460,000 | 0.5 V | P2 | 100,000 | 2.7 V | — | — | — |
| Ex. A3 | P1 | 70,000 | 3.2 V | P2 | 240,000 | 1.9 V | P2 | 960,000 | 0.3 V |
| Com. Ex. A1 | P1 | 960,000 | 0.3 V | P2 | 880,000 | 0.3 V | P2 | 750,000 | 0.3 V |

As a result of the evaluation, in Examples A1 and A2, the positively charged cyan particles move toward the negative electrode side and the negatively charged magenta particles move toward the positive electrode side, upon application of a direct voltage. Thereafter, when a triangle wage is applied, the magenta particles having a lower threshold (the voltage at which the particles start to move) start to move toward the positive electrode side. At this time, the cyan particles having a higher threshold (the voltage at which the particles start to move) remain at the positive electrode side. Therefore, the positive electrode side exhibits a blue color (a mixed color of cyan and magenta) while the negative electrode side is transparent due to the absence of particles for display (electrophoretic particles).

On the other hand, in Example A3, the positively charged cyan particles move toward the negative electrode side and the negatively charged magenta and yellow particles move toward the positive electrode side, upon application of a direct voltage. Thereafter, when a triangle wave is applied to the electrode assembly, the yellow particles having the lowest threshold move toward the positive electrode, whereby the positive electrode side exhibits a green color (a mixed color of cyan and yellow) and the negative electrode side exhibits a magenta color. When the applied voltage is increased, the magenta particles move toward the positive electrode. As a result, the positive electrode side exhibits a black color (a mixed color of cyan, yellow and magenta) while the negative electrode side is transparent.

In Comparative Example A1, when a direct voltage is applied to the electrode assembly first, the positively charged cyan particles move to the negative electrode side and the negatively charged magenta and yellow particles move to the positive electrode, as with the case in Example A3. However, as a triangle wave is applied, particles of all colors start to move since there is no significant difference in the threshold values of these particles (difference in voltages at which the particles start to move). As a result, the negative electrode side exhibits a cyan color and the positive electrode side exhibits a red color due to the presence of both magenta and yellow color.

In view of the above, the Examples exhibits a color with suppressed intermixing as compared with the Comparative Example, due to the difference in voltages at which the particles of each color start to move.

All publications, patent applications, and technical standards mentioned in this specification are herein incorporated by reference to the same extent as if each individual publication, patent application, or technical standard was specifically and individually indicated to be incorporated by reference.

What is claimed is:

1. A particle dispersion for display comprising:
   first particles for display comprising a colorant and a first polymer having a first charging group, the first particles for display being movable in response to an electric field;
   a first polymeric dispersant attached to the first particles for display;
   second particles for display comprising a colorant and a second polymer having a second charging group, the second particles for display being movable in response to an electric field;
   a second polymeric dispersant attached to the second particles for display; and
   a dispersing medium in which the first particles for display and the second particles for display are dispersed,
   the first polymeric dispersant and the second polymeric dispersant having different weight average molecular weights so that the first particles for display and the second particles for display start moving upon application of different voltages, and
   the weight average molecular weight of the first polymeric dispersant being at least from about 3 times to about 20 times greater than that of the second polymeric dispersant, or the weight average molecular weight of the second polymeric dispersant being at least from about 3 times to about 20 times greater than that of the first polymeric dispersant.

2. The particle dispersion for display according to claim 1, wherein:
   the first charging group of the first polymer of the first particles for display is an acidic group or a basic group;
   the first polymeric dispersant has a group that is acidic if the first charging group is basic, and has a group that is basic if the first charging group is acidic;
   the second charging group of the second polymer of the second particles for display is a group that is acidic if the first charging group is basic, and is a group that is basic if the first charging group is acidic;
   the second polymeric dispersant has a group that is acidic if the second charging group is basic, and has a group that is basic if the second charging group is acidic,
   the first particles for display and the second particles for display have a different charging polarity to each other, and the first particles for display and the first polymeric dispersant form an acid-base interaction with each other, and the second particles for display and the second polymeric dispersant form an acid-base interaction with each other.

3. A display medium comprising:

a pair of substrates, at least one of the pair of substrates being transparent; and a particle dispersion for display, the particle dispersion for display comprising:

first particles for display comprising a colorant and a first polymer having a first charging group, the first particles for display being movable in response to an electric field;

a first polymeric dispersant attached to the first particles for display;

second particles for display comprising a colorant and a second polymer having a second charging group, the second particles for display being movable in response to an electric field;

a second polymeric dispersant attached to the second particles for display; and a dispersing medium in which the first particles for display and the second particles for display are dispersed, the first polymeric dispersant and the second polymeric dispersant having different weight average molecular weights so that the first particles for display and the second particles for display start moving upon application of different voltages, and the weight average molecular weight of the first polymeric dispersant being at least from about 3 times to about 20 times greater than that of the second polymeric dispersant, or the weight average molecular weight of the second polymeric dispersant being at least from about 3 times to about 20 times greater than that of the first polymeric dispersant.

4. The display medium according to claim 3, wherein:

the first charging group of the first polymer of the first particles for display is an acidic group or a basic group;

the first polymeric dispersant has a group that is acidic if the first charging group is basic, and has a group that is basic if the first charging group is acidic;

the second charging group of the second polymer of the second particles for display is a group that is acidic if the first charging group is basic, and is a group that is basic if the first charging group is acidic;

the second polymeric dispersant has a group that is acidic if the second charging group is basic, and has a group that is basic if the second charging group is acidic, the first particles for display and the second particles for display have a different charging polarity to each other, and the first particles for display and the first polymeric dispersant form an acid-base interaction with each other, and the second particles for display and the second polymeric dispersant form an acid-base interaction with each other.

5. A display device comprising the display medium according to claim 3 and a voltage application unit that applies a voltage to the pair of substrates.

6. A display medium comprising:

a pair of electrodes, at least one of the pair of electrodes being transparent; and a space formed between the pair of electrodes, the space comprising a particle dispersion for display, the particle dispersion for display comprising:

first particles for display comprising a colorant and a first polymer having a first charging group, the first particles for display being movable in response to an electric field;

a first polymeric dispersant attached to the first particles for display;

second particles for display comprising a colorant and a second polymer having a second charging group, the second particles for display being movable in response to an electric field;

a second polymeric dispersant attached to the second particles for display; and a dispersing medium in which the first particles for display and the second particles for display are dispersed, the first polymeric dispersant and the second polymeric dispersant having different weight average molecular weights so that the first particles for display and the second particles for display start moving upon application of different voltages, and the weight average molecular weight of the first polymeric dispersant or the second polymeric dispersant, whichever is greater, being at least from about 3 times to about 20 times greater than the other.

7. The display medium according to claim 6, wherein:

the first charging group of the first polymer of the first particles for display is an acidic group or a basic group;

the first polymeric dispersant has a group that is acidic if the first charging group is basic, and has a group that is basic if the first charging group is acidic;

the second charging group of the second polymer of the second particles for display is a group that is acidic if the first charging group is basic, and is a group that is basic if the first charging group is acidic;

the second polymeric dispersant has a group that is acidic if the second charging group is basic, and has a group that is basic if the second charging group is acidic, the first particles for display and the second particles for display have a different charging polarity to each other, and the first particles for display and the first polymeric dispersant form an acid-base interaction with each other, and the second particles for display and the second polymeric dispersant form an acid-base interaction with each other.

8. A display device comprising the display medium according to claim 6 and a voltage application unit that applies a voltage to the pair of substrates.

* * * * *